INVENTORS
DAVID W. CAYTON
WILLIAM S. TSUCHIYA
MERLIN D. HOSLER

Aug. 25, 1970 D. W. CAYTON ET AL 3,525,403

CROP THINNING MACHINE

Filed Dec. 12, 1966 13 Sheets-Sheet 2

INVENTORS
DAVID W. CAYTON
WILLIAM S. TSUCHIYA
MERLIN D. HOSLER

CROP THINNING MACHINE

INVENTORS
DAVID W. CAYTON
WILLIAM S. TSUCHIYA
MERLIN D. HOSLER

CROP THINNING MACHINE

INVENTORS
DAVID W. CAYTON
WILLIAM S. TSUCHIYA
MERLIN D. HOSLER

INVENTORS
DAVID W. CAYTON
WILLIAM S. TSUCHIYA
MERLIN D. HOSLER

INVENTORS
DAVID W. CAYTON
WILLIAM S. TSUCHIYA
MERLIN D. HOSLER

CROP THINNING MACHINE

Filed Dec. 12, 1966 13 Sheets-Sheet 7

INVENTORS
DAVID W. CAYTON
WILLIAM S. TSUCHIYA
MERLIN D. HOSLER

INVENTORS
DAVID W. CAYTON
WILLIAM S. TSUCHIYA
MERLIN D. HOSLER

INVENTORS
DAVID W. CAYTON
WILLIAM S. TSUCHIYA
MERLIN D. HOSLER

CROP THINNING MACHINE

INVENTORS
DAVID W. CAYTON
WILLIAM S. TSUCHIYA
MERLIN D. HOSLER

INVENTORS
DAVID W. CAYTON
WILLIAM S. TSUCHIYA
MERLIN D. HOSLER

INVENTORS
DAVID W. CAYTON
WILLIAM S. TSUCHIYA
MERLIN D. HOSLER

INVENTORS
DAVID W. CAYTON
WILLIAM S. TSUCHIYA
MERLIN D. HOSLER

United States Patent Office 3,525,403
Patented Aug. 25, 1970

3,525,403

CROP THINNING MACHINE

David Walter Cayton, Whittier, William Sadayuki Tsuchiya, Los Angeles, and Merlin Dale Hosler, Compton, Calif., assignors to Deere & Company, Moline, Ill., a corporation of Delaware Filed Dec. 12, 1966, Ser. No. 601,108
Int. Cl. A01b *63/10*
U.S. Cl. 172—107 8 Claims

ABSTRACT OF THE DISCLOSURE

An agricultural machine for thinning row crops by driving a cutting blade alternately back and forth across each plant row in response to contact of an electrical probe with plants in the row as the machine moves along the row, in such a way as to cut spaced blocks of plants from the row and leave standing in each row a number of plants which are generally uniformly spaced at the proper intervals for optimum plant growth.

BACKGROUND OF THE INVENTION

This invention relates to agricultural machinery and more particularly to automatic crop thinning devices.

It is common practice in the agricultural industry to plant the seeds of certain crops in much larger number and at much closer intervals than the desired number and spacing of the plants to be finally grown, since germination of these crop seeds is substantially less than one hundred percent. After germination, blocks of the young plants must be removed from each plant row at uniformly spaced intervals to provide a final row containing plants at the desired intervals. Although a great variety of automatic crop thinning machines have been devised, they have not proven to be commercially acceptable and this crop thinning operation is still commonly performed by hand.

Most, if not all, of the existing automatic crop thinning machines, as well as the present improved crop thinning machine, may be described generally as comprising a vehicle movable along a crop or plant row to be thinned, at least one crop thinning blade or other tool mounted on the vehicle for movement between an extended position wherein the tool is disposed for engagement with plants in the row and a retracted position wherein the tool is disposed to clear the plants, a detector for sensing individual plants in the plant row, and means controlled by the detector for driving the thinning tool between its extended and retracted positions as the vehicle travels along the plant row in such a way that the tool is periodically extended and retracted to remove blocks of plants and other undesirable growth from the row. The existing crop thinning machines of this kind employ various types of plant detectors including mechanical devices which rely on physical movement or displacement of a sensing member by each detected plant, photoelectric devices which rely on interruption of a radiant energy beam by or reflection of the beam from each detected plant, and electrically conductive devices which rely on electrical current flow between a conductive probe and ground through each detected plant. In some of these existing crop thinning machines the plant detector is positioned in front of the crop thinning tool. The crop thinning tool is extended to and retracted from its plant engaging position in response to control signals from the plant detector. Machines of this type utilize various distance measuring and/or timing devices to control the length of the crop-free regions or blocks between the remaining plants. In other existing crop thinning machines the plant detector is positioned behind the crop thinning tool. In the latter machines, the crop thinning tool is normally retracted from its plant engaging position and is extended to this position in response to control signals from the plant detector. In this case, the length of each plant-free block in the finally thinned plant row is determined primarily by the length of the crop thinning tool or blade. The disclosed crop thinning machine of the present invention utilizes this latter mode of operation. As will appear from the ensuing description, however, at least some of the improvements provided by the invention may be employed in crop thinning machines which utilize other operating modes.

Among the major deficiencies of the existing crop thinning machines are their complexity, high cost, tendency to break down and malfunction, difficulty and cost of operation and repair, short service life, inefficient or otherwise unacceptable crop thinning action, and generally overall impractical construction and modes of operation which render the existing machines ill-suited to or incapable of high speed crop thinning.

SUMMARY OF THE INVENTION

A general object of the invention is to provide improvements for agricultural machines which are particularly suited for use in crop thinning machines to avoid the deficiencies of the existing agricultural machines for this purpose.

Other objects of the invention are to provide an improved agricultural machine of the character described which is characterized by its simplicity of construction, and economy of manufacture; high speed tool carrier arresting action resulting in increased reliability of operation, long service life, and immunity to breakdown, overheating, and other malfunction; ease of servicing and repair; high operating speed resulting in optimum crop thinning action; immunity to false plant detection caused by debris on the ground; accuracy of gauging the proper elevation relative to the ground of the plant detectors and crop thinning blades; adjustability to accommodate various crop row spacings as well as both single and multiple row crops; and its other highly desirable characteristics which particularly adapt the machine to its intended purposes.

Other objects, advantages, and features of the invention will become readily evident from the ensuing description, taken in connection with the attached drawings.

GENERAL ORGANIZATION AND OPERATION

Figure 1:
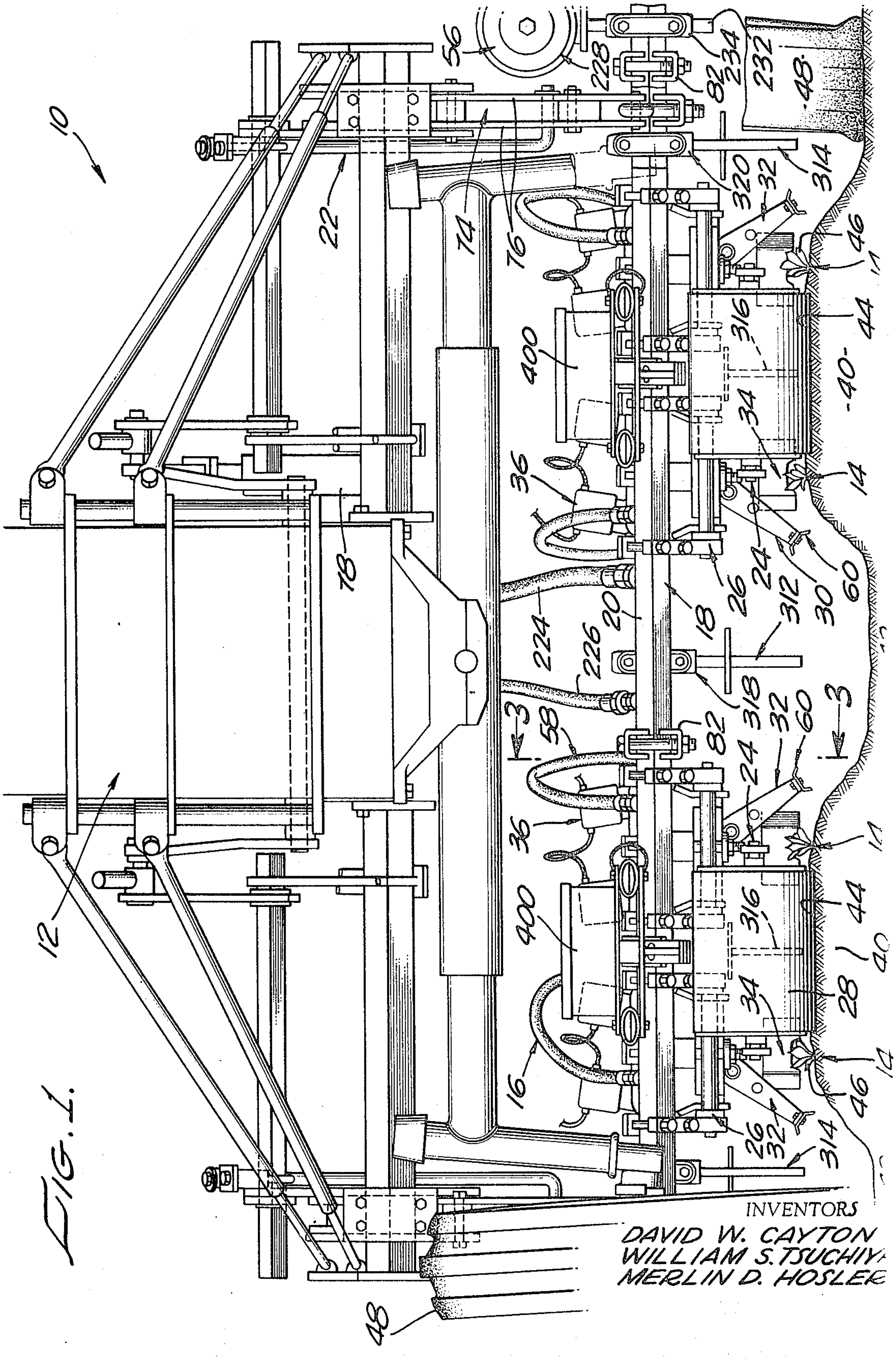
FIG. 1 is a front elevation of an improved double row crop thinning machine according to the invention.

Referring now to the drawings, the crop thinning machine 10 of the invention which has been selected for illustration comprises, in general terms, a crop thinning attachment 16 mounted on a vehicle or conventional agricultural tractor 12 by means of a standard cultivator carriage 22. The crop thinning attachment has a main tool bar frame 18, which adjustably mounts two front roller subframes 24 and four rear thinner subframes 26. The front roller subframes each mount a ground roller 28, while the rear thinner subframes each mount a removable crop thinning device 30. Each crop thinning device has a blade carrier 32 mounted for lateral swinging movement between two rest positions on either side of the plant row 14 to be thinned, a plant detector 34 for electronically sensing individual plants 46 in the plant row, and fluid pressure means 36 controlled by the detector for driving the tool carrier between its two rest positions in response to sensing of a plant by the detector. The fluid pressure means 36 of the crop thinning device comprises two single-acting hydraulic actuators 160, 162, each controlled by a solenoid valve 192. Mounted on each rear thinner subframe 26 is a ground-engaging gauge wheel 38 for supporting the latter subframe on the ground and thereby vertically locating the plant thinning device 30 and particularly the blade carrier 32 and plant detector 34, relative to the ground.

In operation, the crop thinning machine 10 moves along the plant rows 14 in such a way that the wheels 48 of the crop thinning vehicle 12 ride in the furrows 42 between the adjacent plant beds 40, and the crop thinning attachment 16 spans two adjacent beds, as shown in FIG. 1. The two front roller subframes 24 are laterally positioned on the main tool bar frame 18 in such a manner that each ground roller 28 is positioned in the center of one of the plant beds 40 spanned by the crop thinning attachment. The rear thinner subframes are centered over the plant rows 14 such that the gauge wheels 38 on the thinner subframes are disposed to track behind the ground rollers 28. The ground rollers thus compact and flatten the intervening crest area 44 of the adjacent plant bed 40 traversed by the corresponding pair of gauge wheels, in such a manner that the gauge wheels are conditioned to accurately vertically locate the crop thinning devices 30 relative to the ground.

As the crop thinning machine 10 proceeds down the row of plants 14 and the plant detector 34 of a crop thinning device contacts a plant 46 in the row, an electrical circuit is completed through the plant to ground, which acts to change the positions of the solenoid valves 192 which control the hydraulic actuators 160, 162 of the same crop thinning device. The hydraulic actuators then swing the blade carrier 32 from the rest position it then occupies to its opposite rest position. During this stroke of the carrier, the blade 60 on the carrier sweeps across the plant row 14 and removes a block of plants 46 therefrom, directly in front of the plant which was sensed by the detector. This plant remains intact. The blade carrier remains in its latter rest position until the plant detector travels the length of the plant-free gap now existing in the plant row and senses the first plant following the gap. The positions of the valves 192 are again changed, which results in the hydraulic actuators 160, 162 driving the blade carrier back to its original position, again removing a block of plants from the row. This operation is repeated in each of the plant rows until the crop thinning machine reaches the end of the plant rows.

TOOL BAR FRAME AND CARRIAGE MEANS

The tool bar frame 18 is comprised of two hollow rectangular metal tubes 20, rigidly joined at their centers and adjacent their ends by cross frame members 82. The tool bars 20, which extend parallel to one another crosswise of the tractor, have removable end caps 80. The sealed chambers or passages formed within the tool bars define the working fluid supply manifold 62 and return manifold 64.

The carriage means 22 for supporting the crop thinning attachment 16 on the tractor are shown to be a standard cultivator carriage which includes a pair of parallel bar mechanisms 74 at opposite sides of the tractor 12, rear upright supporting members or hangers 76, and a hydraulic cylinder 78 for vertically raising and lowering these hangers. The cultivator carriage hangers 76 are rigidly secured to the ends of the rear tool bar 20 of the tool bar frame 18.

FRONT GROUND ROLLER ASSEMBLIES

The front roller subframes 24 (shown in FIGS. 1–5 and 12) which support the ground rollers 28 on the main tool bar frame 18 are similar in construction. Each front subframe includes a pair of parallel side bars 84 which are joined at their center by a cross plate 86 and at their rear ends by a cross shaft 88 rotatably mounting a cross tube 90. The ground rollers 28 comprise cylindrical drums which are rotatably supported between the front ends of their respective subframe side bars 84, as shown. Welded to the center of the rear cross tube 90 of each roller subframe 24 is an upright supporting arm 92 which is adjustably supported by a clamp-like mounting bracket 94 on the rear tool bar 20. The mounting brackets 94 for the two roller subframes 24 are adjustable along the rear tool bar 20.

Each roller subframe 24 is urged downwardly by a spring 96. The upper end of each spring 96 seats against a rearwardly extending arm 98 of a clamp bracket 100 which is adjustably secured to the front tool bar 20. Extending axially through each spring 96 and the adjacent spring seat arm 98 is a shaft 102. The lower end of each shaft 102 extends centrally through and is rigidly fixed to the cross plate 86 of the adjacent roller subframe 24. Collars 104 are rigidly fixed on each spring shaft 102 above the respective spring seat arms 98 and below the lower ends of the respective springs 96. Accordingly, the springs 96 thrust downwardly against the lower spring shaft collars 104 to urge the roller subframes 24 downwardly to lower limiting positions wherein the upper shaft collars 104 seat on the adjacent spring seat arms 98. When the attachment 16 is in normal working position on the ground, the shaft collars 104 are elevated out of contact with the arms 98, whereby downward spring pressure on the roller subframes urges the ground rollers 28 against the ground to aid the ground compacting and leveling action of these rollers.

REAR THINNER ASSEMBLIES

The rear thinner subframes 26 of the present crop thinning atachment 16 are also generally similar. Each thinner subframe has a pair of side bars 106 joined at their front ends by a cross tube 108, at their rear ends by a cross member 110. The front end of each thinner subframe 26 is disposed between the depending arms 112 on a pair of clamp-like mounting bracket 114. Mounting brackets 114 are adjustably secured to the front tool bar 20. Extending between the lower ends of bracket arms 112 of each bracket pair 114 is a pivot shaft 116 which extends through the front cross tube 108 of the adjacent thinner subframe 26. Both the roller and thinner subframes 24, 26 are independently adjustable along their respective tool bars 20 by loosening their respective mounting brackets 94, 114.

The rear thinner subframes 26 mount gauge wheels 38 for vertically locating the latter frames, and particularly their crop thinning devices 30, relative to the ground. In order to prevent these gauge wheels from sinking into soft soil, it is desirable to counterbaalnce a major portion of the weight of each thinner subframe. This is accomplished by counterbalancing springs 118. The lower end of each spring 118 seats against an arm 120 on a bracket 121 which is adjustably secured to the rear tool bar 20. Extending through each spring 118 and its spring seat arm 120 is a shaft 122 mounting an adjustable spring seat 124 at its upper end. The lower end of each spring shaft 122 extends through a removable bracket 123 on the front side of the corresponding adjacent crop thinning device 30 and mounts locknuts 126 below the bracket. Each spring 118 urges its respective thinner subframe 26 upwardly and thereby counterbalances a portion of the subframe weight. The portion of the subframe weight carried by each counterbalancing spring is adjustable by adjusting the upper spring seat 124. In practice, each spring 118 is adjusted to carry a major portion of the weight of its respective thinner subframe 26, thereby to permit the corresponding gauge wheel 38 to ride over the ground with sufficient contact pressure to accurately gauge the elevation of the subframe without sinking into soft soil. The gauge wheels 38 roll along the crests of the plant beds 40, between and adjacent the corresponding plant rows 14, after these crests have been compacted and rolled flat by the leading ground rollers 28. The gauge wheels are thus able to vertically locate their respective crop thining devices 30 in proper crop thinning relation to the ground with optimum accuracy. Each ground roller 28 prepares the crest of the adjacent plant bed 40 for the gauge wheels 38 of the two adjacent crop thinning devices 30.

Each thinner subframe 26 mounts a removable crop thinning device 30. The four crop thinning devices embodied in the present crop thinning machine are identical. Each crop thinning device 30 comprises a generally rectangular box frame 128 (FIGS. 6–8 and 12) including upstanding front and rear walls 130 and upstanding side walls 132 which are rigidly joined to one another, as by welding. The box frame 128 of each crop thinning device is laterally dimensioned to fit closely between the two side bars 106 of its respective supporting thinner subframe 26, in the region midway between the ends of the latter frame. Each crop thinning device 30 is releasably secured to its respective thinner subframe 26 by bolts 134. It is evident, therefore, that each crop thinning device 30 may be removed as a unit from its respective thinner subframe 26 by removing the corresponding mounting bolts 134.

The crop thinning blade carrier 32 of each crop thinning device 30 comprises an open rectangular, yoke-like frame 136. This blade carrier frame includes a pair of arms 138 which are rigidly joined at their lower extremities by a cross member 140 and intermediate their ends by a connecting strut 142 and a pivot shaft 144. Extending coaxially through the upper ends of the carrier frame arms 138 are aligned bores 146. The common axis of these bores, the cross member 140, the connecting strut 142 and the pivot shaft 144 parallel one another and are disposed substantially in a common plane containing the carrier side frame arms 138. The lower cross member 140 of the tool carrier frame 136 mounts the crop thinning tool or blade 60.

The crop thinning blade 60 of each crop thinning device 30 is generally channel-shaped in transverse cross section and includes a central web 148 and side flanges 150 which depend in diverging relation from the longitudinal side edges of the web. The lower edges of these flanges are sharpened to form cutting edges 152. Each blade 60 is somewhat longer than, and is disposed with its central web 148 seating against, the underside of the lower cross member 140 of its respective carrier frame 136. Each blade is releasably secured, in longitudinally centered relation, to its adjacent carrier frame cross member 140 by bolts 154. Each crop thinning blade 60 may thus be removed from its respective blade carrier 32 for sharpening or replacement by releasing its mounting bolts 154. The length of the crop thinning blade, which may be varied according to the particular crop being thinned, is typically on the order of eight to ten inches. The ends of each blade are rounded, as shown best in FIG. 3, to prevent the blade from undercutting the bases of the plants left standing in the row. It is significant to note here that each blade 60 extends in parallel relation to the common axis of the bores 146 in its respective carrier frame 136.

The upper end of each blade carrier frame 136 is disposed between the front and rear walls 130 of the corresponding crop thinner box-frame 128. Mounted on and projecting beyond the inner surfaces of the front and rear box-frame walls 130 of each crop thinning device 30, approximately on the longitudinal centerline of the respective thinner subframe 26, are pivot shafts 156. One of these pivot shafts is rigid on and removable with the counter-balance spring bracket 123 on the respective crop thinning device. This bracket is bolted to the front box-frame wall 130 of the device. The other pivot shaft 156 is rigid on a removable bracket 157 bolted to the rear box-frame wall 130. Each blade carrier 32 is pivotally mounted on its respective pivot shafts 156 by means of sealed self-aligning bearings 158. Each crop thinning blade carrier 32 is thus pivotally mounted for swinging laterally of the crop thinning vehicle or tractor 12 about a pivot axis which coincides approximately with the longitudinal centerline of the corresponding crop thinner subframe 26.

Each crop thinning device 30 also includes a pair of linear fluid pressure actuators 160 and 162 (FIG. 18) for driving the corresponding blade carrier 32 in an oscillatory motion about its pivot axis. These actuators form part of the fluid pressure carrier driving means 36. The two actuators 160, 162 of each crop thinning device 30 are essentially identical and differ only in their fluid porting and valving and in the manner in which the actuators are connected to the corresponding blade carrier 32. Each of the illustrated actuators includes a cylinder 164 and a plunger 166 movable in the cylinder. Suitable sealing means (not shown) are provided between the cylinder and plunger. Each actuator cylinder 164 has a lower cylindrical portion 168 and an upper, generally rectangular portion 170. The upper rectangular portion 170 of each actuator cylinder 164 is dimensioned to fit closely between the front and rear walls 130 of the corresponding crop thinner box-frame 128 and mounts coaxial pivot shafts 172 which extend through aligned bores 174 in the adjacent crop thinner box-frame walls 130. The cylinder pivot shafts 172 are pivotally supported in the frame walls 130 by sealed self-aligning bearings 176. The pivot axes of the two actuators 160, 162 of each crop thinning device 30 parallel the pivot axis of the corresponding oscillatory blade carrier 32 and are located in a common plane parallel to and disposed a distance above the carrier pivot axis. In addition, the pivot axes of the two hydraulic actuators of each crop thinning device are located at opposite sides of and are spaced substantially equal distances from an intervening vertical plane containing the pivot axis of the corresponding blade carrier. Accordingly, the hydraulic actuators 160, 162, like the oscillatory blade carriers 32, are supported to swing laterally of the crop thinning vehicle or tractor 12 and in a plane substantially normal to the direction line of movement of the tractor.

The plunger 166 of each hydraulic actuator 160, 162 includes a cylindrical piston 178 which slides in the bore 180 of its respective actuator cylinder 164. On the lower end of the plunger 166 of each actuator 160 is a clevis 182 having bores 184 extending coaxially through its spaced arms 186. On the lower end of the plunger 166 of each actuator 162 is a tongue 188 having a bore 190. The two hydraulic actuators 160, 162 of each crop thinning device 30 are arranged in such a way that the tongue 188 on the plunger 166 of the actuator 162 fits slidably between the arms 186 of the clevis 182 on the plunger of the corresponding actuator 160. The bores 184, 190 in the interengaging clevis arms and tongue are coaxially aligned and receive the pivot shaft 144 of the corresponding oscillatory blade carrier frame 136.

The fluid pressure tool carrier driving means 36 comprise, in addition to the hydraulic actuators 160, 162, solenoid valves 192 of an all-ports-closed configuration (FIG. 18) for controlling the flow of hydraulic working fluid to and from the actuators. Each valve 192 controls one of the actuators and is removably secured to the upper end of its respective actuator. The illustrated solenoid valves 192 are elongated in one direction and are mounted on their respective hydraulic actuators in such a way that the long dimension of each valve parallels the pivot axis of its actuator. In order to avoid interference of the adjacent valves 192 of the adjacent crop thinning devices 30, the upper ends of the actuators of each device incline toward one another and terminate in upper inclined seating faces 194 to which the valves 192 are bolted. These seating faces are disposed at acute angles relative to the longitudinal axes of their respective actuators, as shown.

Figure 18:
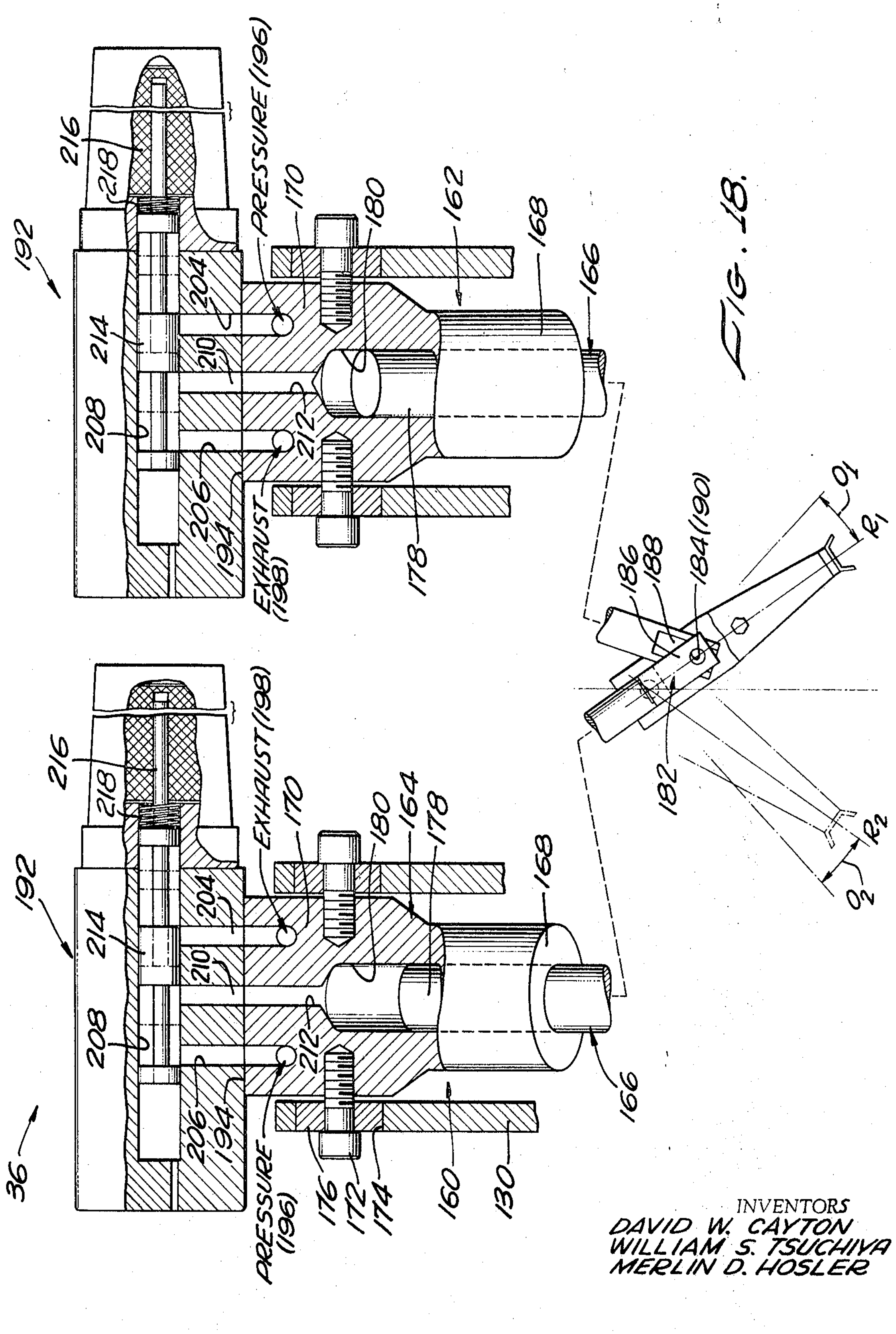
FIG. 18 is a semi-diagrammatic showing of the hydraulic actuators and cutting blade of one crop thinning device of the crop thinning attachment illustrating, in particular, the valving and fluid porting of the actuators.

Each hydraulic actuator cylinder 164 has a hydraulic fluid inlet or pressure port 196 and a hydraulic fluid exhaust port 198. The inlet port 196 of each actuator communicates with the hydraulic fluid supply manifold 62 in the rear tool bar 20 of the tool bar frame 18 via a flexible hydraulic fluid supply conduit 200. The exhaust port 198 of each actuator communicates with the hydraulic fluid return manifold 64 in the front tool bar via a flexible hydraulic fluid return conduit 202. The inlet and exhaust ports 196, 198 in each hydraulic actuator 160, 162 are located at opposite sides of the respective actuator cylinder 164 and communicate with hydraulic fluid inlet and exhaust ports 204, 206, respectively, in the corresponding actuator valve 192 via passages which open through the upper seating face 194 of the actuator. The ports 204, 206 in each valve open to opposite ends of a chamber 208 in the valve. Each actuator valve 192 has a center port 210 communicating to the upper end of the cylinder bore 180 in its respective actuator via a passage 212 in the actuator which opens through its upper seating face 194. Each actuator valve 192 contains a plunger or spool 214 which is movable lengthwise of the corresponding valve chamber 208 between first and second positions, herein referred to as supply and return positions. FIG. 18 illustrates the valve spool for one actuator 160 in its supply position and the valve spool for the corresponding actuator 162 in its return position. As is evident from this latter figure, the spool 214 of each valve, when in its supply position, communicates the inlet port 196 of the corresponding hydraulic actuator 160 or 162 to the actuator cylinder bore 180. In its return position, the spool of each valve communicates the exhaust port 198 of its respective actuator to the corresponding cylinder bore.

Each valve spool 214 is positioned by the opposing action of a solenoid 216 and a spring 218. Two valve solenoids of each crop thinning device 30 are connected to the electrical circuit in such a manner that both are always in the same state, whether energized or de-energized. These valve solenoids and springs are arranged in such a way that when the solenoids of both valves 192 in the crop thinning device 30 are de-energized, the spring in one of the valves urges its respective valve spool to its supply position and the spring of the other valve urges its respective spool to its return position. When energized, the valve solenoids urge their respective valve spools to their opposite positions (FIG. 18). Thus, when the two actuator valves 192 of any crop thinning device 30 are both energized, the valves are positioned to admit high pressure working fluid from the supply manifold 62 to the cylinder bore 180 of the corresponding hydraulic actuator 160 and to exhaust hydraulic fluid from the cylinder bore of the other hydraulic actuator 162 to the return manifold 64, thus to effect driving of the corresponding blade carrier 32 in one direction. When the two valves are both de-energized, the valves are positioned to admit high pressure fluid to the actuator 162 and exhaust fluid from the actuator 160 to effect driving of the blade carrier in the opposite direction. The actuators 160, 162 rock back and forth about their respective pivot axes as they drive the blade carriers in this oscillatory swinging motion.

HYDRAULIC SYSTEM

The present crop thinning machine 10 includes a fluid presusre system 50 for supplying working fluid under pressure to the crop thinning devices 30. This system (illustrated in FIG. 17) includes a source 52 of working fluid under pressure, a low pressure fluid receiver 54, an accumulator 56, and fluid conductor means 58 for conveying working fluid through the system. In the particular crop thinning machine illustrated, the fluid source 52 and fluid receiver 54 comprise, respectively, a hydraulic fluid pump and a hydraulic fluid reservoir which are mounted on the tractor 12 and form part of the standard hydraulic system of a typical agricultural tractor. The pump 52 is driven by the tractor engine and has its intake connected to the reservoir 54 for pumping hydraulic fluid under pressure from the reservoir. A typical agricultural tractor of this kind has external hydraulic fluid supply and return connections 220 and 221 for operating hydraulic equipment which may be used with the tractor. The supply connection 220 communicates to the discharge of the pump 52 through a manual shut-off valve 222 and a pressure regulator 223 shown to be a pump stroke control valve. The tractor return connection 221 communicates to the reservoir 54.

According to the present invention, the tractor hydraulic fluid connections 220, 221 are utilized to connect the pump 52 and reservoir 54 to the hydraulic supply manifold 62 and return manifold 64, respectively, defined by the chambers within the hollow tool bars 20. To this end, hydraulic fluid supply and return conduits or flexible hoses 224 and 226 are secured at one end to the tool bar 20, with the hose passages communicating to the supply and return manifolds, respectively, in the tool bars. The opposite ends of the hoses, 224, 226 have couplings which are releasably secured to the tractor supply and return connections 220, 221. When the present crop thinning attachment 16 is installed on the tractor 12, therefore, the hydraulic system of the attachment receives hydraulic working fluid under pressure from and returns low pressure hydraulic fluid to the tractor hydraulic system.

Figure 2:
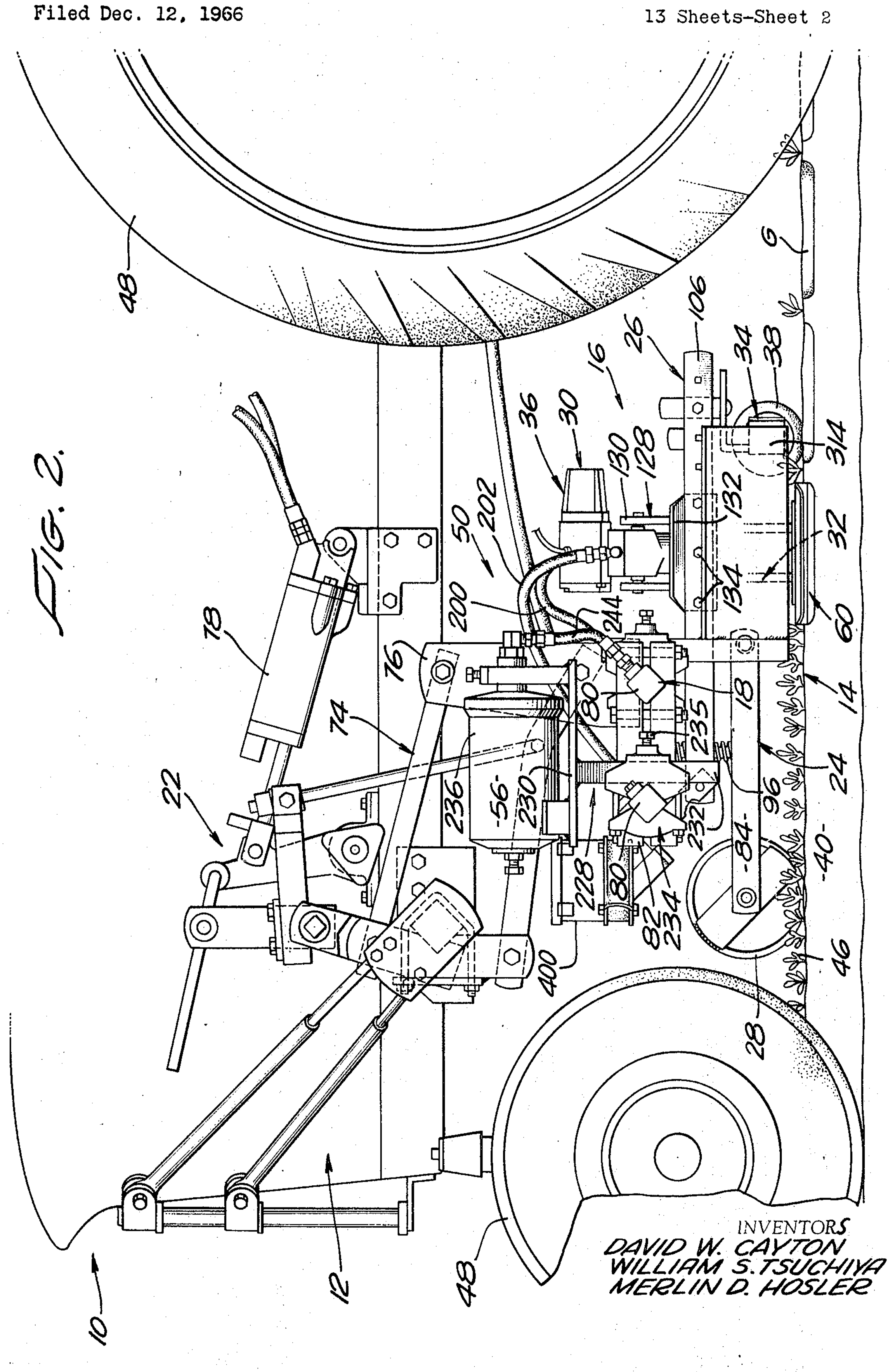
FIG. 2 is a fragmentary side elevation of the crop thinning machine.
Figure 3:
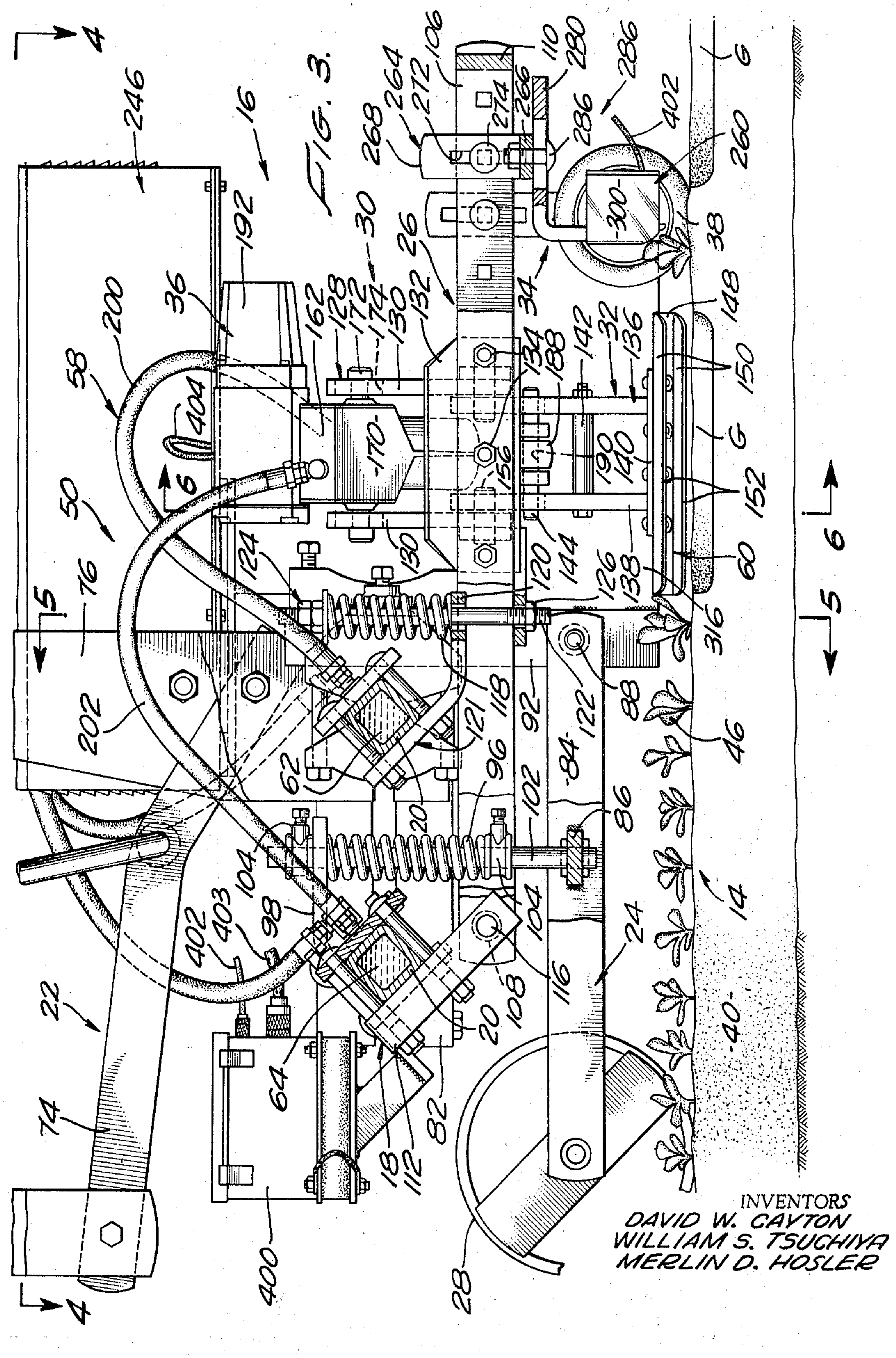
FIG. 3 is an enlarged vertical section through a crop thinning attachment of the machine taken on line 3—3 in FIG. 1.
Figure 4:
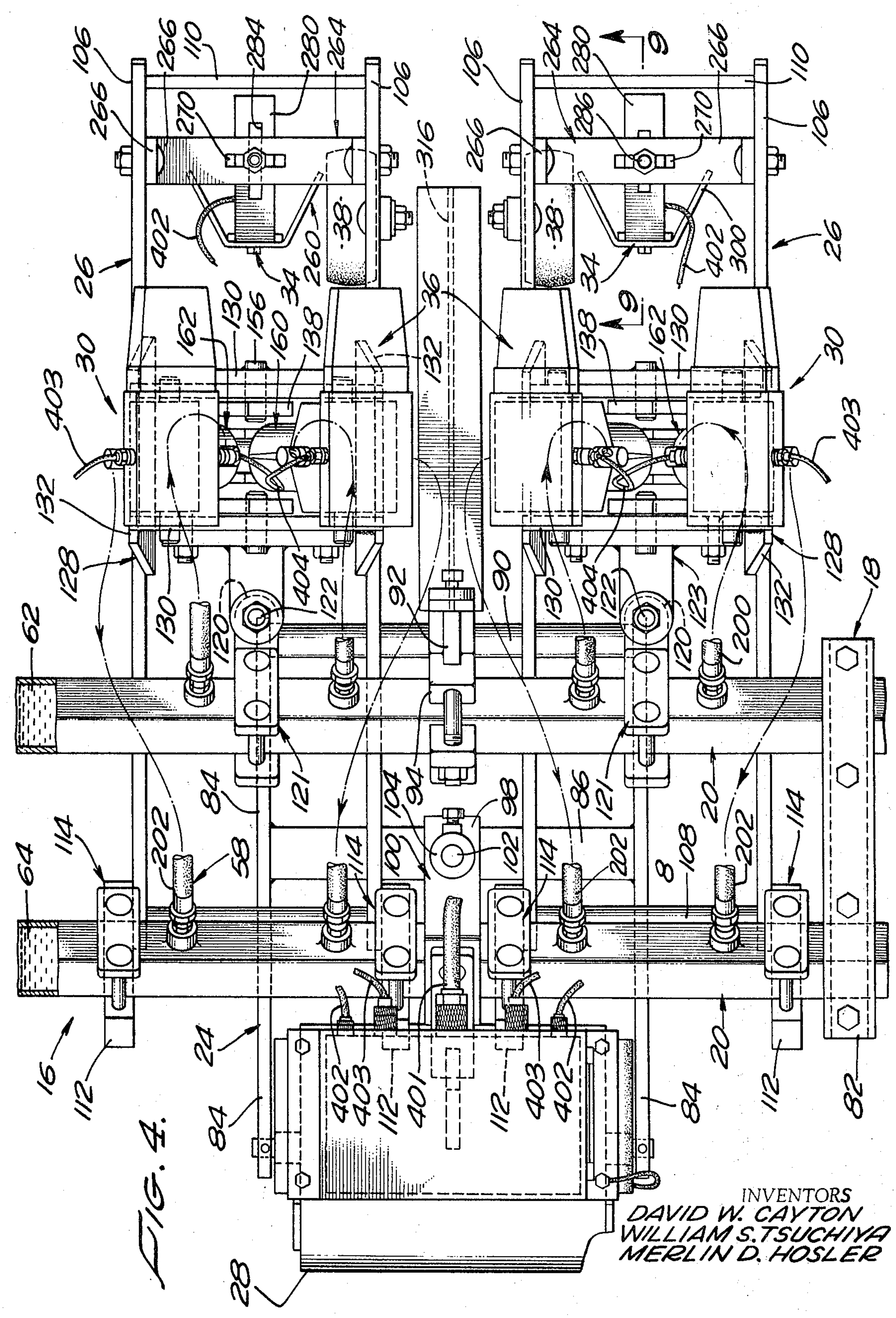
FIG. 4 is a fragmentary top plan view of the crop thinning attachment.
Figure 5:
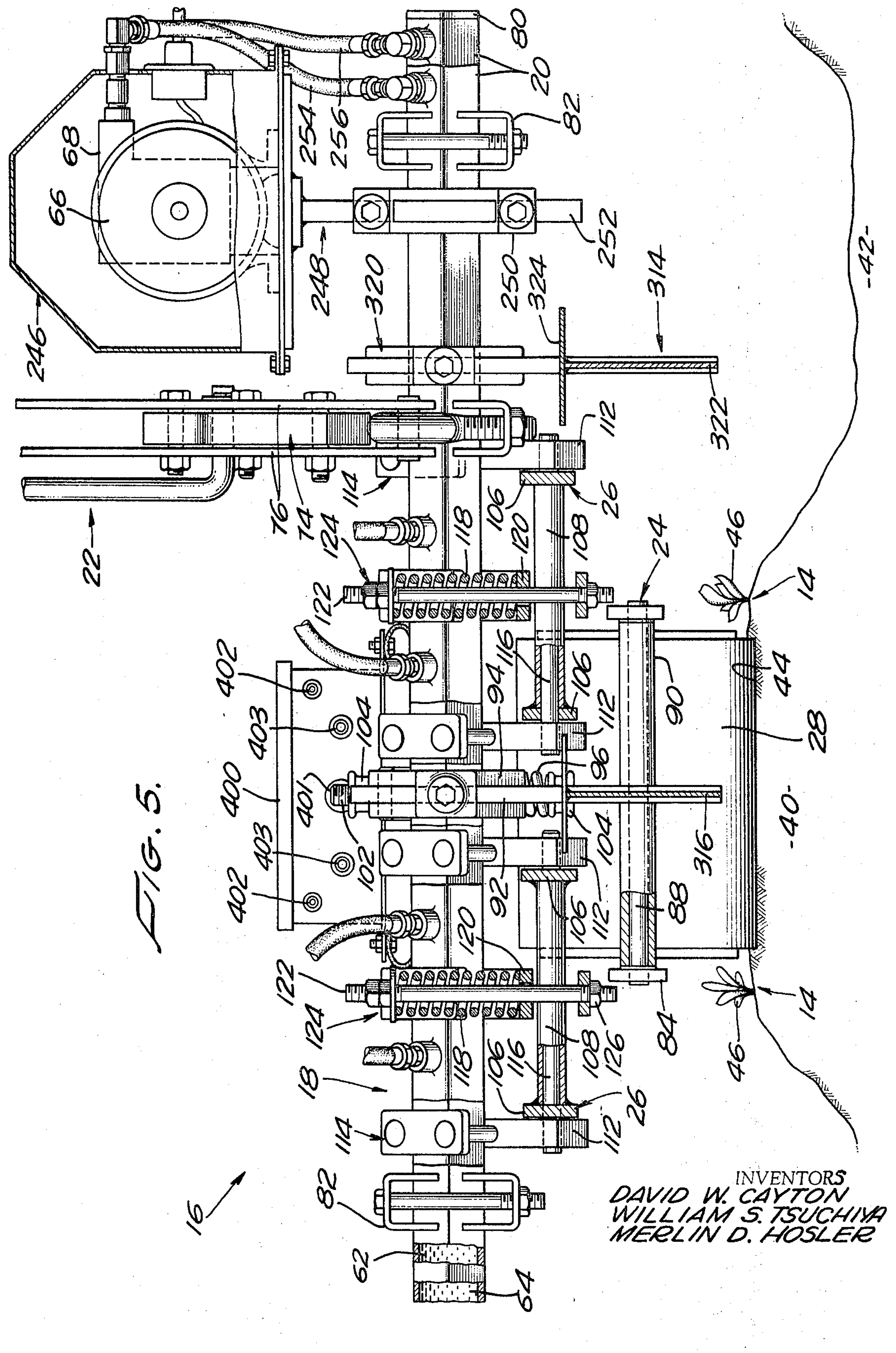
FIG. 5 is a section taken on line 5—5 in FIG. 3.
Figures 6, 7, 8:
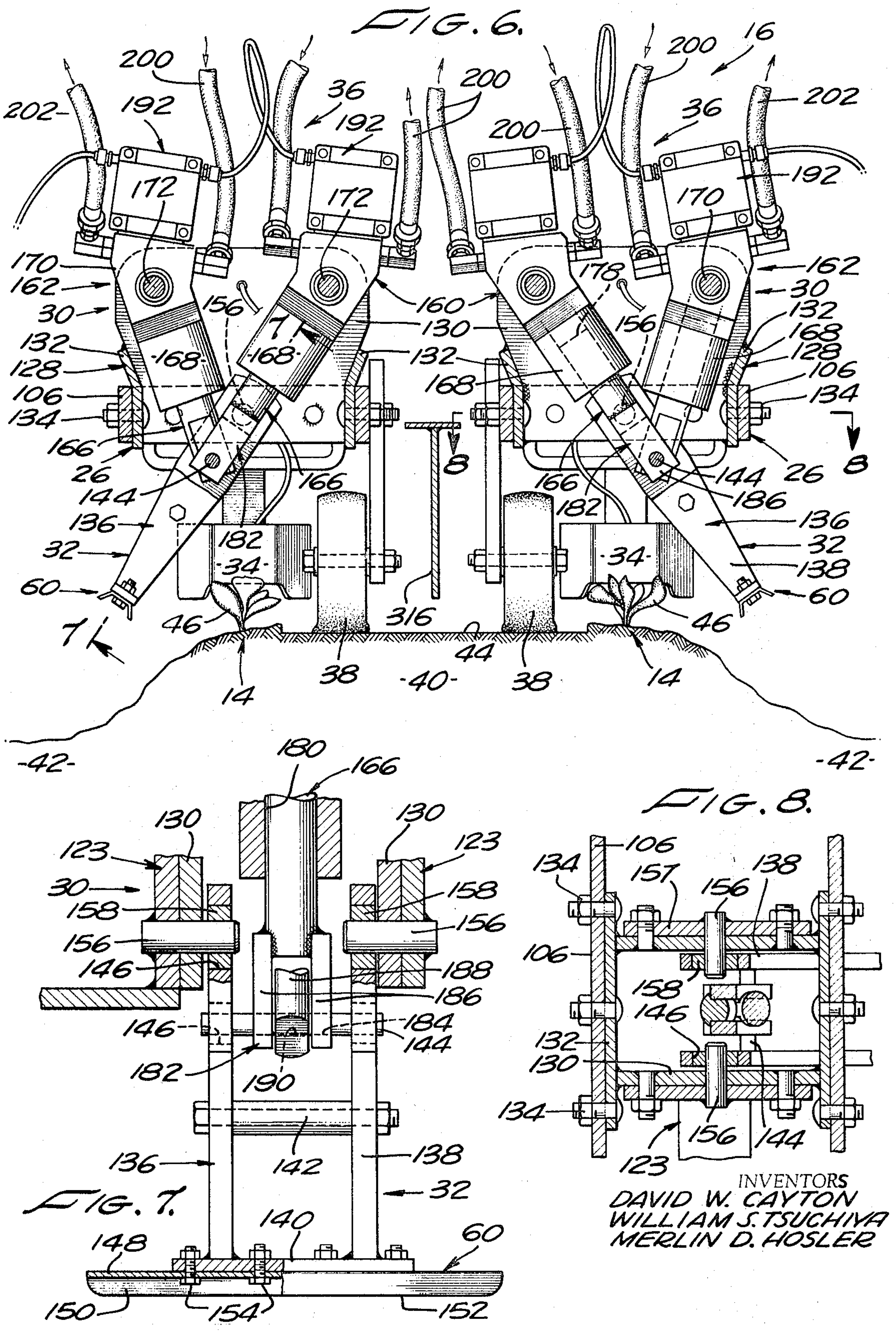
FIG. 6 is a section taken on line 6—6 in FIG. 3 and illustrating, in particular, a pair of crop thinning devices embodied in the attachment.
FIG. 7 is an enlarged section taken on line 7—7 in FIG. 6.
FIG. 8 is an enlarged section taken on line 8—8 in FIG. 6.

The accumulator 56 of the present crop thinning attachment 16 is mounted on the main tool bar frame 18 by means of an adjustable support 228 (FIGS. 1 and 2). This support includes an upper platform 230 to which the accumulator is attached and a lower post 232 which extends slidably through a mating guideway in a clamp bracket 234. A setscrew 235 threaded in this bracket is engageable with the post to retain the accumulator in adjusted vertical position relative to the bracket. Clamp bracket 234 is secured to one outboard end of the front tool bar 20. The accumulator 56, itself, is conventional and includes an outer housing 236 (FIG. 17) containing a diaphragm 238 which divides the interior of the housing into a pressurizing fluid chamber 240 and a working fluid chamber 242. The pressurizing chamber 240 is filled with a compressible gas, such as nitrogen, under pressure. The accumulator housing 236 is provided with a suitable inlet (not shown) through which the pressurizing chamber 240 may be charged with the pressurizing gas. In a typical crop thinning machine according to the invention, the accumulator is initially charged with pressurizing gas under a pressure on the order of 1200 p.s.i. The working fluid chamber 242 of the accumlulator communicates to the supply manifold 62 within the rear tool bar 20 by means of a flexible hydraulic conduit or hose 244 which attaches to one end of the latter tool bar. Hydraulic working fluid may thus flow back and forth between the supply manifold 62 and the working fluid chamber 242 of the accumulator 56.

Energizing current for the electrical control circuits 72 and the hydraulic actuator control valves 192 is furnished by the generator 66 which is driven by the hydraulic motor 68. Generator 66 and its driving motor 68 are contained within a housing 246 (FIG. 5) mounted, by means of an adjustable support 248, on the outboard end of the front tool bar 20 remote from the accumulator 56. The support 248, which is substantially identical to the accumulator support 228, includes a clamp bracket 250 which is adjustably secured to the front tool bar 20 and slidably receives a depending supporting post 252 on the generator-motor housing 246. The generator motor 68 has hydraulic fluid inlet and exhaust ports which are connected, by flexible hydraulic supply and return conduits or hoses 254, 256, respectively, to the tool bar supply manifold 62 and return manifold 64, at the adjacent ends of the tool bars 20. The pressure compensating flow control valve 70 is connected in the high pressure fluid flow path to the motor. This valve is conventional and serves to maintain a constant rate of hydraulic fluid flow through the generator motor 68, and thereby a constant motor speed and a constant output voltage at the terminals of the generator 66, regardless of fluctuations in the hydraulic fluid pressure within the supply manifold 62 occasioned by operation of the crop thinning devices 30.

During operation of the crop thinning machine, the tractor hydraulic pump 52 is driven from the tractor engine to pump hydraulic working fluid under pressure from the hydraulic fluid reservoir 54 on the tractor into the hydraulic fluid supply manifold 62 of the crop thinning attachment 16. The hydraulic fluid flows through this manifold to the inlet port of the generator drive motor 68, to the inlet ports 196 of the crop thinner hydraulic actuators 160, 162, and to the hydraulic accumulator 56. The hydraulic fluid which is thus supplied to the generator motor 68 flows through this motor to the hydraulic fluid return manifold 64 in the tool bar frame 18 and then through the latter manifold back to the tractor hydraulic fluid reservoir 54. The motor 68 is thereby powered to drive the generator 66 and provide at the generator output terminals an electrical voltage for energizing the electrical control circuits 72 and the hydraulic actautor control valves 192. When the actuator valve solenoids 216 are all de-energized, the hydraulic fluid which is supplied to the inlet ports 196 of the crop thinner actuators 162 flows through the corresponding actuator valves 192 into the respective actuator cylinder bores 180. At this time, the valves 192 of the remaining crop thinner actuators 160 are positioned to communicate their respective actuator cylinder bores 180 to the tractor hydraulic fluid reservoir 54 through the hydraulic fluid return manifold 64.

The hydraulic working fluid which flows to the accumulator 56 enters its working fluid chamber 242 and forces the actuator diaphragm 238 outwardly against the pressure of the gas within the accumulator pressurizing chamber 240. The gas is thereby compressed and the pressure of the hydraulic working fluid in the accumulator, and hence the working fluid pressure in the supply manifold 62, are increased. When this working fluid pressure increases to a preset maximum working level, typically on the order of 2,250 p.s.i., the tractor pressure regulator 223 operates to stop the flow of hydraulic fluid to the crop thinning attachment 16. The pressure regulator remains in this condition until the working fluid pressure drops to some preset minimum working level due to consumption of the high pressure working fluid by the crop thinning devices 30 and the generator motor 68. At this point, the pressure regulator 223 again operates to deliver working fluid under pressure to the crop thinning attachment, thereby to restore the maximum working fluid pressure level.

BLADE CARRIER ARRESTING ACTION

Figures 13, 14, 15:
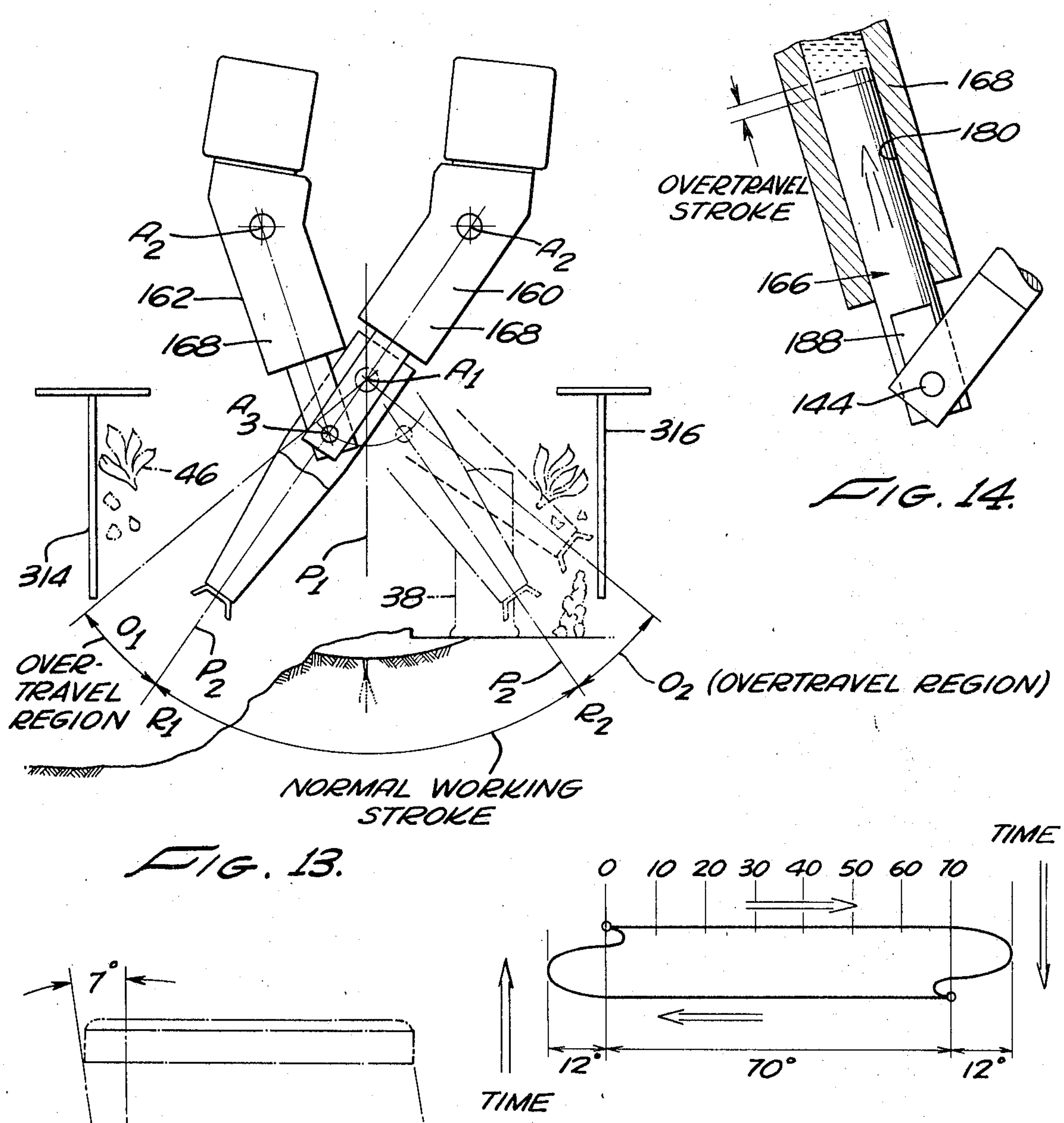
FIG. 13 is a semi-diagrammatic showing of one crop thinning device embodied in the crop thinning attachment and illustrating, in particular, the oscillatory cutting motion of the device.
FIG. 14 is an enlarged fragmentary section through one hydraulic actuator of the crop thinning device shown in FIG. 13 illustrating certain overtravel motions which occur in the actuator during operation of the crop thinning devices.
FIG. 15 is a diagram depicting the oscillatory cutting motion of each crop thinning device of the crop thinning attachment.

It will be observed in FIG. 13 that the oscillatory swinging motion of the blade carrier 32 about its pivot axis $A_1$ occurs through two deadcenter positions $R_1$ and $R_2$, shown in solid and dotted lines, respectively, located at opposite sides of an intervening vertical neutral plane $P_1$ containing the carrier pivot axis $A_1$. In each of these deadcenter positions, the carrier pivot axis $A_1$, the pivot axis $A_2$ of the cylinder 164 of one of the blade carrier actuators 160 or 162, as the case may be, and the pivot axis $A_3$ of the pivotal connection between the actuator plungers 166 and the blade carrier are located in a common plane $P_2$ or $P_3$, as the case may be, inclined at an acute angle relative to the neutral plane $P_1$. The actuator 160 drives the blade carrier 32 in the direction of its deadcenter position $R_1$, and the actuator 162 drives the carrier in the direction of its deadcenter position $R_2$. During driving of the blade carrier 32 from either deadcenter position, the driving torque exerted on the carrier by its currently pressurized actuator 160 or 162 progressively diminishes as the carrier approaches its other deadcenter position and becomes zero when the carrier arrives at the latter position. The blade carrier 32 tends to normally assume a condition of rest in one deadcenter position or the other, depending upon the electrical state of its respective actuator solenoid valves 192. For this reason, the deadcenter positions $R_1$, $R_2$ are referred to herein as normal positions of rest, or simply rest positions.

When the solenoid valves 192 are operated to pressurize the blade carrier actuators 160 or 162 and thereby effect driving of the blade carriers 32 from one rest position to the other, a major portion or all of the hydraulic working fluid delivered to the pressurized actuators is derived from the accumulator 56, depending upon the condition of the tractor pressure regulator 223. If this pressure regulator is conditioned to deliver high pressure fluid, some of the high pressure working fluid for pressurizing the active actuators is obtained directly from the tractor pump 52. On the other hand, if the pressure regulator is conditioned to terminate delivery, the working fluid for pressurizing the active actuators is initially obtained solely from the accumulator 56. In this latter case, of course, the pressure regulator will cut in in response to the drop in working fluid pressure in the accumulator and the hydraulic fluid supply manifold 62 occasioned by consumption of the high pressure working fluid by the currently active blade carrier actuators 160 or 162, as the case may be, to maintain the hydraulic fluid pressure within its normal working range. The hydraulic fluid passages through which the working fluid flows to and from the actuators are made relatively large to minimize both the pressure drop in the high pressure fluid flowing to the actuators and the back pressure at the actuator exhaust ports 198. Accordingly, during each working stroke of the blade carriers 32, a maximum pressure differential exists between the working fluid pressure within the cylinder bores 180 of the active, i.e., pressurized, actuators 160 or 162, as the case may be, and the cylinder bores of the corresponding inactive, i.e., nonpressurized, actuators. In a typical crop thinning attachement according to the invention, for example, this pressure differential closely approximates the working fluid pressure in the accumulator 56 and is on the order of 2,250 p.s.i.

Such a high pressure differential between the two driving actuators for each blade carrier 32 during its working strokes results in correspondingly high velocity movement of the carrier through its strokes. The time required for the blade to move from one to the other of its rest positions $R_1$, $R_2$ is typically 25 milliseconds. Such high velocity blade carrier movement is essential to minimize the effective cut angle, relative to the ground, of the crop thinning blades 60 on the carriers, as required for optimum crop thinning action of the blades. Because of this high velocity movement of the blade carriers 32 between their rest positions $R_1$ and $R_2$, the blade carriers, and their respective driving actuators 160, 162, possess high angular momentum or kinetic energy upon arrival of the blade carriers at each rest position. A major feature of the invention under discussion is concerned with dissipating this high energy of the blade carriers at the end of each of their working strokes in such a way as to arrest the carriers without adverse reaction and return the carriers to their adjacent rest position. In regard to this arresting action, it is evident from FIG. 13 that the high kinetic energy possessed by each blade carrier 32 and its respective driving actuators 160, 162 upon arrival of the carrier at each rest position $R_1$ and $R_2$ tends to continue driving of the carrier through and beyond these positions. The regions beyond the normal rest positions of each blade carrier 32 into which the carrier tends to be driven by this energy are indicated by the reference characters $O_1$ and $O_2$ and hereinafter referred to as overtravel regions.

Each time high pressure working fluid is admitted to the cylinder bore 180 of either driving actuator 160 or 162 for any blade carrier 32, to drive the carrier from one rest position $R_1$ or $R_2$ to the other rest position, the working fluid chamber defined by the cylinder progressively expands as a result of outward expulsion of the corresponding actuator plunger 166 until the blade carrier arrives at its corresponding rest or deadcenter position. During the initial portion of the working stroke of each blade carrier 32 from one rest position to the other rest position, then, energy is effectively transferred from the hydraulic accumulator 56 to the carrier to drive the latter through its working stroke. On the other hand, continued driving of the blade carrier 32 through the rest position toward which the carrier moves during each working stroke into the adjacent overtravel region $O_1$ or $O_2$, as the case may be, by the high angular momentum or kinetic energy of the blade carrier and its actuators, results in reverse motion of the plunger 166 of the currently pressurized actuator 160 or 162 into its respective actuator cylinder bore 180, as shown in FIG. 14. This reverse or inward movement of the plunger into the cylinder bore of the currently pressurized actuator displaces high pressure working fluid from the bore, through the hydraulic fluid supply manifold 62, back into the accumulator 56 against the resisting effort of the pressurized gas in the accumulator pressurizing chamber 240. During this latter, overtravel portion of the working stroke of each blade carrier 32, then, energy is effectively transferred from the carrier to the accumulator. Such reverse flow of working fluid from a pressurized blade carrier actuator to the accumulator compresses the pressurizing gas in the accumulator pressurizing chamber 240, with the result that the working fluid pressure in the cylinder bore 180 of the presurized actuator increases. This increase in working fluid pressure and the retarding force exerted on the blade carrier by its non-pressurized actuator, produces a braking effort on the corresponding blade actuator 32 which eventually arrests the carrier within the adjacent overtravel region $O_1$ or $O_2$. At this point the effective kinetic energy of the blade carrier is zero and the currently pressurized actuator 160 or 162 is disposed to exert a reverse driving torque on the carrier in the direction of its adjacent rest position $R_1$ or $R_2$. Accordingly, energy is again transferred from the accumulator 56 to the blade carrier 32 in a direction to drive the carrier in the reverse direction through the adjacent overtravel region, back toward the adjacent rest position. During this reverse travel of the blade carrier, the latter, and its actuators 160, 162 may again acquire sufficient energy to drive the carrier back through and slightly beyond the adjacent rest position. In this case, working fluid is again displaced from the pressurized actuator to the accumulator, whereby energy is again effectively transferred from the blade carrier to the accumulator, to again arrest the blade carrier. This damped oscillatory motion, which continues until the blade carrier finally comes to rest in its adjacent rest position, is minimized due to the lightweight construction of the blade carriers 32 and their respective cutting blades 60. FIG. 15 is a diagrammatic illustration of this oscillatory motion of the blade carriers.

The blade carrier arresting action just described has several advantages over conventional arresting means. Relatively high intensity impacts, as would occur if the blade carriers were arrested by mechanical means, are avoided, resulting in a reduction of the stresses which exist in the crop thinning device 30. In addition, heating of the working fluid is substantially reduced relative to that which would occur if conventional hydraulic cushioning means were employed.

Heating of the working fluid is also reduced by two other features of construction of the present crop thinning machine. One of these features resides in the fact that the tool bar frame 18, with its supply and return manifolds 62, 64, acts as a heat exchanger which is effective to continuously cool the working fluid as the latter flows through the manifolds. The second feature involves the mounting of the blade carrier actuator control valves 192 directly on their respective blade carrier actuators 160, 162, so as to reduce the effective length of the passages 210, 212 between the valves and their respectve actuator cylinder bores 180, and hence the volume of the working fluid in these passages. Since the fluid in these passages tends to be heated most, a reduction in its volume reduces heating of the working fluid in the overall hydraulic system.

PLANT DETECTORS

As noted earlier, the solenoid control valves 192 for the blade carrier actuators 160, 162 are periodically operated in response to sensing of plants 46 by the plant detectors 34 (shown in FIGS. 1, 3, 4, 9, 10, and 11) as the crop thinning machine 10 travels along the plant rows 14 to be thinned. Generally speaking, each of the plant detectors 34, which are identical, comprises an electrical probe 258, a shield 260 in front of the probe, relative to the direction of travel of the crop thinning machine 10, and an adjustable support 262 mounting the probe and shield on their respective rear crop thinner subframe 26. The support 262 of each plant detector is adjustable in the vertical, fore-and-aft, and lateral directions of the respective thinner subframe to locate the detector shield 260 and probe 258 in proper relation to the ground and the blade 60 of the respective crop thinning device 30.

The adjustable support 262 of each plant detector 34 comprises a generally U-shaped mounting bracket or yoke 264 including a horizontal across bar 266 and upstanding arms 268 rising from the ends of the cross bar. The cross bar and arms of the yoke have longitudinal slots 270 and 272, respectively. Each detector support yoke 264 is positioned between the side bars 106 of its respective thinner subframe 26 with the yoke arms 268 extending upwardly in seating contact with the inner sides of the subframe side bars and the yoke cross bar 266 extending horizontally across the intervening space between the side bars. The arms 268 are secured to the adjacent thinner subframe bars 106 by bolts 274 which extend through the arm slots 272 and bolt holes 276 in the adjacent side bars. Preferably, the thinner subframe side bars 106 are provided with a number of spaced bolt holes 276, as shown, to permit adjustment of each yoke longitudinally of its respective thinner subframe. Each plant detector support 262 further comprises a generally L-shaped mounting bracket 278 including a rear horizontal arm 280 and a front depending vertical arm 282. The horizontal arm 280 of each mounting bracket 278 seats against the underside of its respective detector support yoke cross bar 266 and has a longitudinal slot 284. A bolt 286 extending through the yoke cross bar slot 270 and the bracket arm slot 284 secures the bracket 278 to its respective yoke. The vertical arm 282 of each mounting bracket 278 extends from the front end of the corresponding horizontal bracket 280 and has a bolt hole 288 extending through its lower end. The shield 260 and probe 258 of each plant detector 34 are mounted on the lower end of arm 282 of the corresponding detector mounting bracket 278.

Each detector probe 258 comprises a short metal angle iron having a vertical flange 290 and a horizontal flange 292. This probe is located at the rear side of its respective detector support bracket arm 282. Between the latter arm and probe is an electrical insulator 294 in the form of a small rectangular plastic plate. The vertical probe flange 290 is secured to the rear side of the insulator by bolts 296. Each detector shield 260, which may be formed from plastic or other suitable materal, comprises a forward vertical wall 298 and vertical side walls or wings 300 extending rearwardly in diverging relation from the vertical side edges of the front shield wall 298. On the rear side of the front shield wall are vertical side ribs 302 defining therebetween a vertical channel for receiving the bracket arm 282. Each shield 260 is located at the front side of the respective bracket arm 282. The probe 258, shield 260, insulator 294, and spacer 304 of each plant detector 34 are joined in assembled relation and secured to the corresponding detector support 262 by means of the bolt 306 which extends through the shield, insulator, and the bolt hole 288 in the respective bracket arm 282, as shown. Each detector probe 258 has an electrical terminal 308 attached to its horizontal flange 292.

The lower edges of the shield and the vertical probe flange 290 are located below the level of the respective support bracket arm 282 and insulator 294. The lower edge of the vertical probe flange 290, in turn, is vertically disposed in optimum plant sensing relation with respect to the lower edge of the shield. In the illustrated plant detector 34, for example, the front wall 298 of each probe shield 260 has a lower cut out 310 in line with the adjacent plant probe 258, and the lower edge of the vertical probe flange 290 projects slightly below the horizontal edge of this cut out. The side wings 300 of each shield extend downwardly a distance below the lower edge of the vertical probe flange 290. This relative disposition of each probe and its respective shield is optimum for many crops but may be varied, if desired, by slotting the bolt hole in the shield, as shown.

The vertical flange 290 of each plant probe 258 is located substantially in a vertical plane containing the rotation axis of the gauge wheel 38 for the corresponding crop thinning device 30. The oscillatory blade carrier 32 of each crop thinning device is pivotally mounted on the corresponding thinner subframe 26 just forwardly of its respective probe 258, between the latter and the forward pivot axis of the thinner subframe relative to the main tool bar frame 18. In addition, each thinner subframe 26 is relatively long, and the corresponding blade carrier 32, plant detector 34, and gauge wheel 38 are located adjacent the rear end of the subframe.

When in operation, the crop thinning blades 60 throw considerable dirt and other debris in the direction of their oscillatory swinging motion. It is desirable or essential to prevent the debris which is thus thrown by the blade of each crop thinning device from striking the plant probe 34 of the adjacent crop thinning device or devices, and to prevent the debris which is thrown by the blades of the crop thinning devices adjacent the sides of the tractor 12 from being projected outwardly beyond the tractor sides and upwardly toward the tractor driver. To this end, the present crop thinning attachment 16 is equipped with a center dirt shield 312, a pair of outboard dirt shields 314, and a pair of intermediate dirt shields 316. The center shield 312 comprises a vertical plate located midway between the two center crop thinning devices 30 and mounted for vertical adjustment on the center of the rear tool bar 20 of the main tool bar frame 18 by means of a bracket 318. The two outboard shields 314 are mounted for vertical adjustment on the outboard ends of the rear tool bar 20 by means of brackets 320. These outboard shields are generally T-shaped in vertical transverse cross section and include vertical plates 322 and horizontal flanges 324 along the upper plate edges. The intermediate shields 316 comprise vertical plates which are located between the two crop thinning devices 30 adjacent each side of the tractor 12 and are welded or otherwise rigidly attached to the vertically adjustable support 92 for the adjacent ground roller subframe 24. The several shields are aligned laterally of the tractor 12 with the oscillatory crop thinning blades 60.

RESUMÉ OF MACHINE OPERATION

The illustrated crop thinning machine 10 is intended for thinning crop rows 14 which are arranged in pairs along the crests of raised plant beds 40 spaced by intervening furrows 42. In accordance with common farming practice, the plant beds 40 are so spaced as to acommodate movement of the crop thinning vehicle or tractor 12 therealong in such a way that the tractor spans two adjacent plant beds and the tractor wheels 48 ride in the furrows 42 located just outboard of these beds, as shown. Although the illustrated crop thinning machine 10 is adapted for thinning double row corps, it may be rearranged to thin single row crops, that is crops which are grown in a single plant row to each plant bed.

Before commencement of the crop thinning operation, the roller subframe 24, thinner subframes 26, plant detectors 34, and gauge wheels 38 must be adjusted to their proper working positions. The roller subframes 24 are adjusted along their respective supporting tool bars 20 of the tool bar frame 18 to position the spring loaded ground rollers 28 for rolling movement along the crests of their adjacent plant beds 40 in the intervening regions 44 between the corresponding plant rows 14. The rear thinner subframes 26 are adjusted along their respective supporting tool bar 20 to locate these subframes in centered, overlying relation to their respective adjacent plant rows 14. When these thinner subframes are properly adjusted, the gauge wheels 38 on the subframes are disposed for rolling movement along the crests of their adjacent plant beds 40, the pivot axes of the blade carriers 32 are disposed in vertical planes containing their adjacent plant rows, and the plant detectors 34 are centered relative to these latter planes, respectively. The plant detectors 34 and gauge wheels 38 are vertically positioned relative to their respective thinner subframes 26 to vertically locate the blade carriers 32, and particularly their crop thinning blades 60, as well as the plant detectors at the proper elevation relative to the ground. Since the front ground roller 28 compacts the soil for the trailing gauge wheel 38, the compaction characteristics of the soil in the plant bed 40 must be compensated for during this initial vertical adjustment of the gauge wheels and plant detectors. Springs 118, which counterbalance the thinner subframes 26, must be initially adjusted so that the thinner subframe is maintained at the proper elevation above the ground without excessive sinking of the gauge wheels into the soil.

After the crop thinning machine 10 has thus been readied for use, the hydraulic fluid shut-off valve 222 is opened to pressurize the hydraulic system 50. This results in driving of the crop thinning blade carriers 32 to one or the other of their normal rest positions $R_1$ or $R_2$, depending on the current electrical state of the solenoid control valves 192 for the blade carrier actuators 160, 162, and in driving of the generator 66 to furnish energizing current for the control circuits 72 and actuator valves 192. The blade carrier 32 of each crop thinning device 30 remains in its initial rest position as the crop thinning machine 10 advances along the underlying plant beds 40 until the probe 258 of the respective crop thinning device contacts a plant 46 in the adjacent plant row 14. As explained in detail later in connection with the electrical control system of the crop thinning machine, this contact of a probe 258 with a plant completes an electrical circuit through the plant to ground and produces a response in the associated control circuit 72 which effects a virtually instantaneous change in the electrical state of the solenoid control valves 192 for the blade carrier actuators 160, 162 of the corresponding crop thinning device 30. This change in the electrical state of the solenoid valves causes their valve spools 214 to shift from their existing positions to their opposite positions. Such shifting of the valve spools results in high velocity swinging movement of the corresponding crop thinning blade carrier 32 from its initial rest position $R_1$ or $R_2$, as the case may be, to its opposite rest position and across the intervening plant row 14. During this working stroke of the blade carrier, the crop thinning blade 60 on the carrier travels along an arcuate path through the soil of the adjacent plant bed 40, thus creating a plant free gap G in the plant row, immediately following the plant engaged by the probe. Accordingly, after the initial cutting stroke of a blade carrier 32, the corresponding probe 258 will not again make contact with a plant in the adjacent plant row until the probe has traveled the length of this first plant free gap G in the row. Upon arrival of the probe at the end of the gap, the probe contacts the first plant 46 immediately following the gap and thus initiates the second working or cutting stroke of its respective blade carrier 32. During this second stroke of the carrier, the latter travels from its current rest position $R_1$ or $R_2$, as the case may be, back to its initial rest position and across the plant row 14 to remove a second block of plants from the row, again immediately following the plant currently engaged by the probe. This results in the creation of a second plant free gap G in the plant row. Thus, as the crop thinning machine 10 proceeds along the underlying plant beds 40, the blade carriers 32 of the crop thinning devices 30 are periodically driven to their respective rest positions $R_1$ and $R_2$ in alternate sequence in response to engagement of their probes 258 with plants 46 in the corresponding plant rows. The carrier blades cut blocks of plants from the rows at generally uniformly spaced intervals and thereby produce generally uniformly spaced plant free gaps G between the remaining plants which are left undisturbed by the crop thinning blades.

Figure 9:
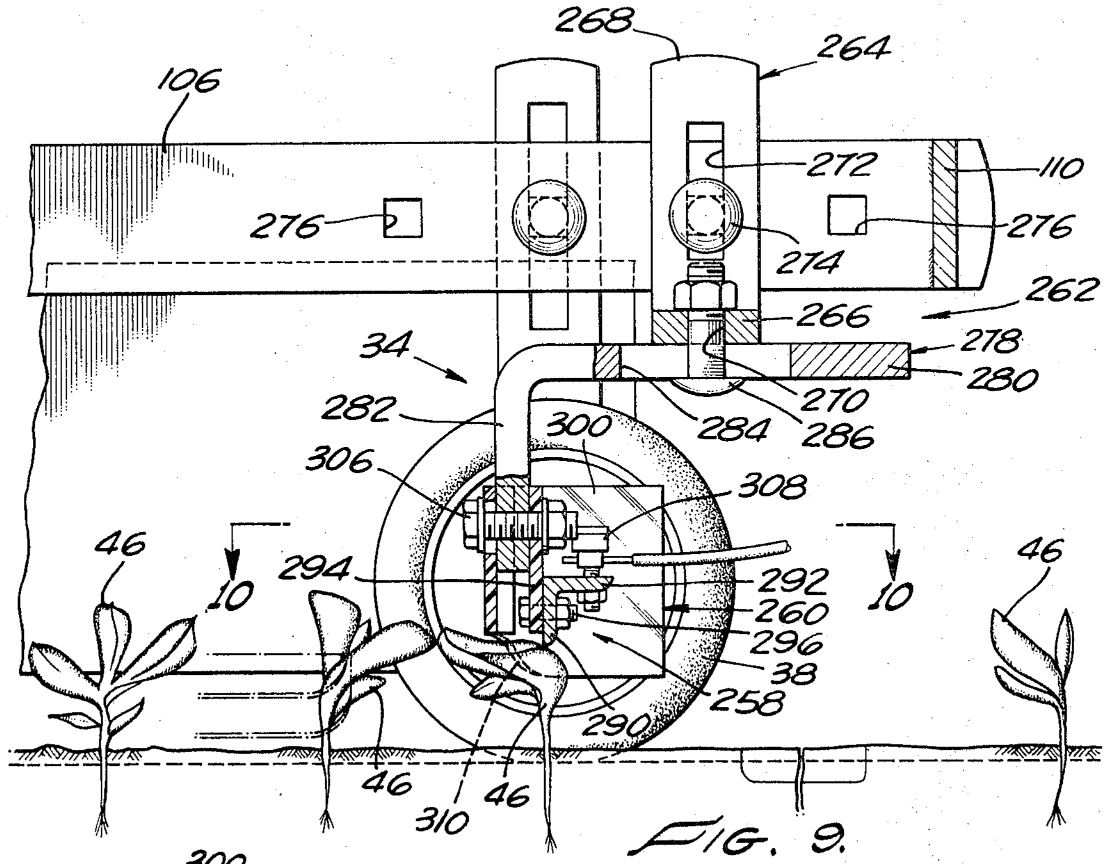
FIG. 9 is an enlarged section taken on line 9—9 in FIG. 4 and illustrating, in particular, a plant detector embodied in the crop thinning attachment.
Figures 10, 11:
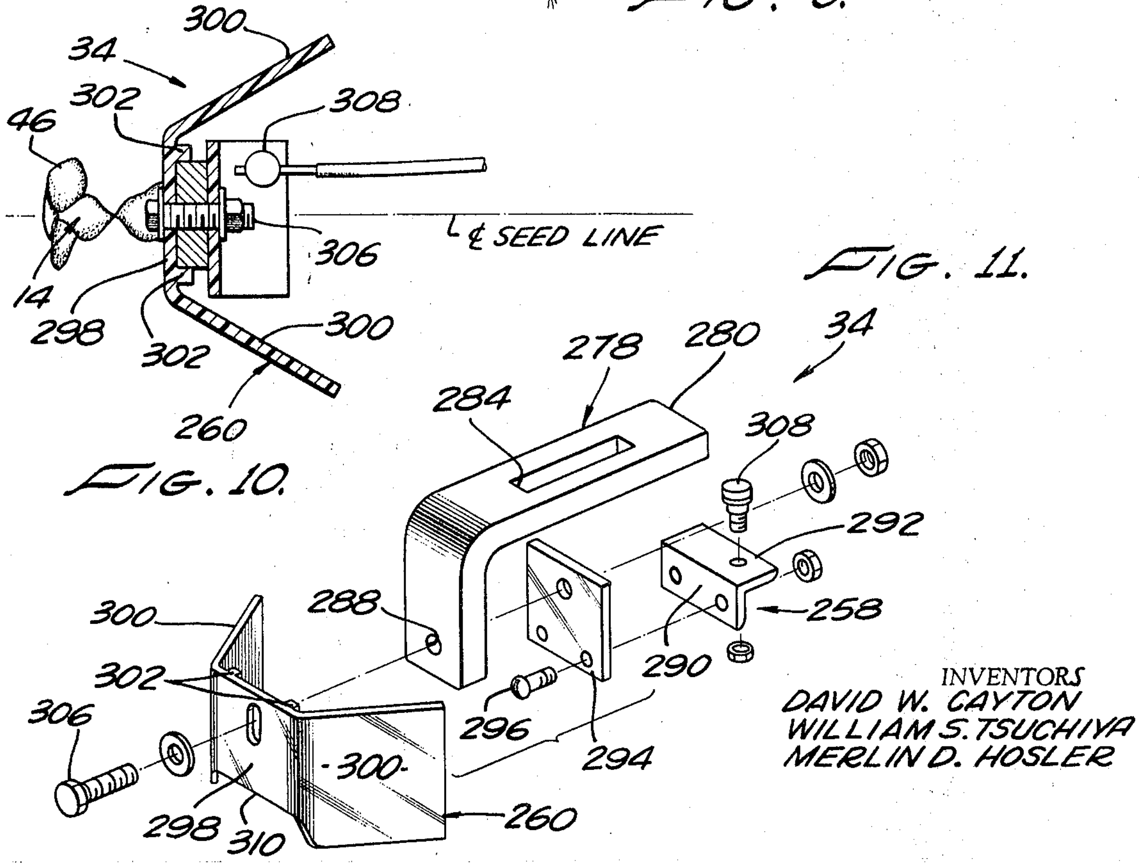
FIG. 10 is an enlarged section taken on line 10—10 in FIG. 9.
FIG. 11 is an exploded perspective view of the plant detector.
Figure 12:
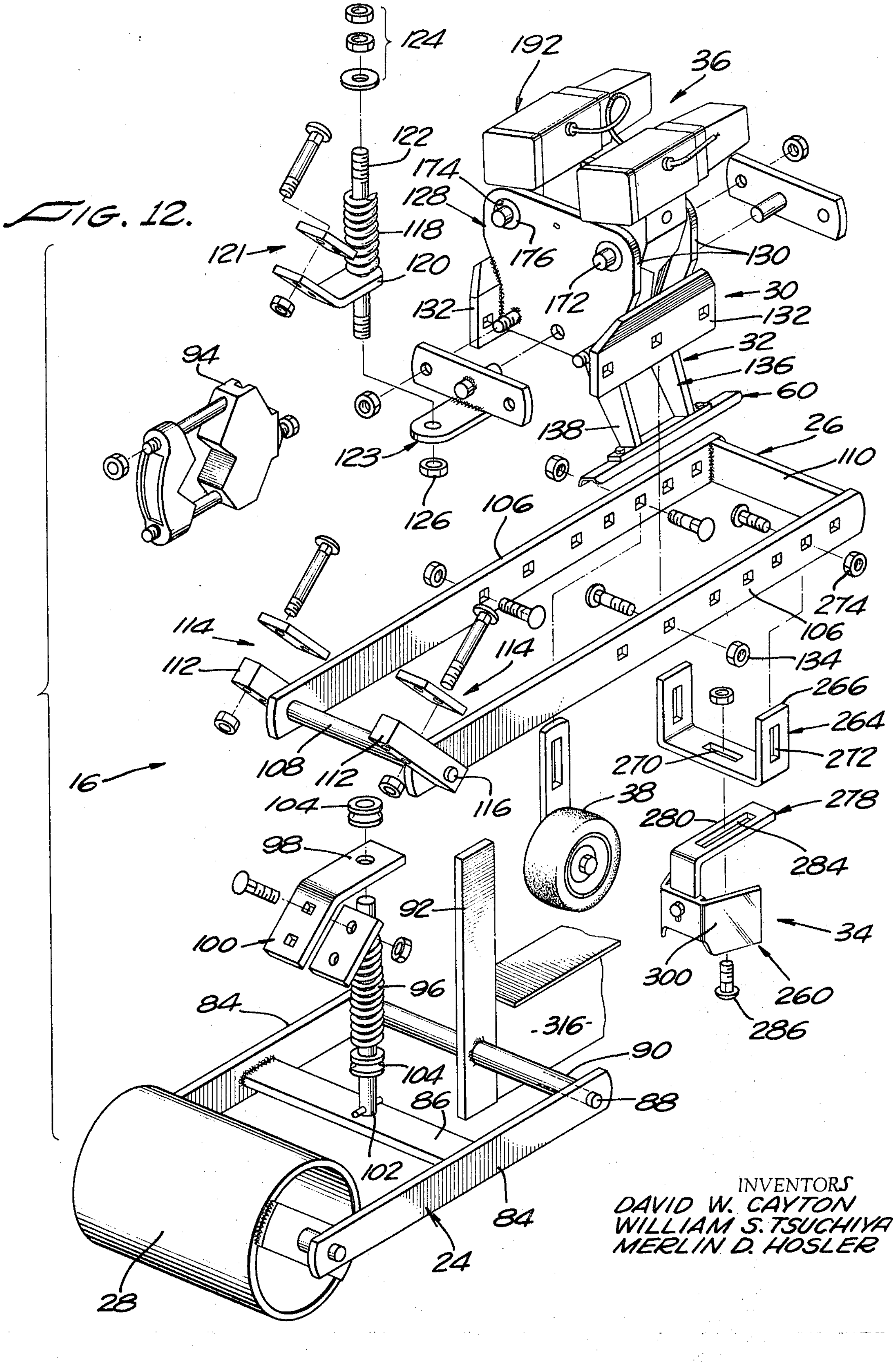
FIG. 12 is a fragmentary exploded perspective view of the crop thinning attachment.

The construction and operation of the plant detectors 34 constitute an important feature of the invention. The probes 258 of the plant detectors are located substantially in vertical planes containing the rotation axes of their respective gauge wheels 38 and are thus maintained with maximum accuracy at the proper elevation relative to the plants 46 in the adjacent plant rows. The shields 260 of the plant detectors 34 are so vertically positioned in front of the probes 258 that the shields function as plows which clear cut plants and other debris from the paths of the probes as the crop thinning machine 10 travels along the plant rows. The shields thus prevent false response in the control circuit 72 and resultant undesirable stroking of the blade carriers 32 due to the presence of this debris. In addition, as illustrated in FIG. 9, the shields 260 act to bend or deflect each plant in their respective plant rows forwardly in the direction of travel of the crop thinning machine 10, regardless of the predominant direction of natural growth of the plant. As a consequence, the relative positions of the plants 46 to the probes 258 during contact of the probes with the plants is always essentially the same. The cut outs 310 in the shields aid in centering the foliage of the plants, laterally of the plant rows, relative to the following probes, thus to further assure uniformity in the disposition of the plants relative to the probes during contact of the latter with the plants.

During operation of the crop thinning machine 10, the hydraulic system of the crop thinning vehicle 12 delivers hydraulic working fluid under pressure to the hydraulic fluid supply manifold 62 of the crop thinning 16. From this manifold, the fluid flows to the hydraulic accumulator 56, the generator drive motor 68, and the crop thinner hydraulic actuators 160, 162. Hydraulic fluid flow to the generator motor 68 occurs through a pressure compensated flow control valve 70, which serves to maintain a constant rate of flow through the generator motor and thereby a constant generator speed and output voltage for energizing the electrical control circuits 72 and the hydraulic actuator solenoid valves 192.

The hydraulic working fluid delivered to the blade carrier actuators 160, 162 results in driving of the crop thinner blade carriers 32 to one or the other of their normal rest positions, depending on the current electrical state of the solenoid control valves 192. The blade carrier 32 is driven in its oscillatory motion by the two actuators 160, 162, each of which comprises a single-acting hydraulic ram. Thus, when the solenoid control valve 192 of one of the actuators is positioned in such a manner as to admit high pressure working fluid into the cylinder bore 180 of its respective actuator, the other solenoid control valve 192 of the crop thinning device 30 is positioned in such a manner as to exhaust working fluid from the cylinder bore of its respective actuator, causing the blade carrier 32 to assume one of its rest positions. When a probe 258 contacts a plant 46, the respective electrical control circuit 72 acts to reverse the positions of both solenoid control valves 192 of the respective crop thinning device, causing the blade carrier 32 to assume its opposite rest position.

Figure 16:
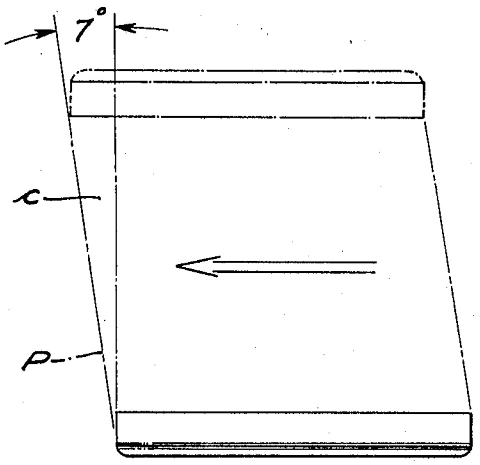
FIG. 16 diagrammatically illustrates the relative motion with respect to the ground of the cutting blade of each crop thinning device during each cutting stroke of the device.

Due to the forward movement of the crop thinning machine 10 during the thinning operation, the movement of the crop thinning blade 60 relative to the ground involves a first component normal to the plant row 14 due to the swinging motion of the blade relative to the tractor 12, and a second component parallel to the plant row due to the movement of the tractor along the row. This relative compound cutting motion of each crop thinning blade 60 causes the path P cut by the blade in the adjacent plant bed 40 to have the general shape of an oblique parallelogram, as illustrated in FIG. 16. According to the present invention, the cut angle C is minimized by driving each crop thinning blade 60 at an extremely high velocity through each of its cutting strokes. The cut angle of the crop thinning blades on a typical crop thinning machine according to the invention, for example, is on the order of 7°.

This extremely high velocity movement of the crop thinning blade carriers 32, and their respective cutting blades 60, through their cutting strokes introduces the problem of arresting the blade carriers at the ends of these strokes without undesirable impact or overheating of the hydraulic working fluid. This is accomplished by the unique blade carrier arresting action described earlier, whereby the kinetic energy of the carrier is transferred back to the hydraulic working fluid in the accumulator 56 at the end of each stroke.

ELECTRICAL CONTROL SYSTEM

Figure 17:
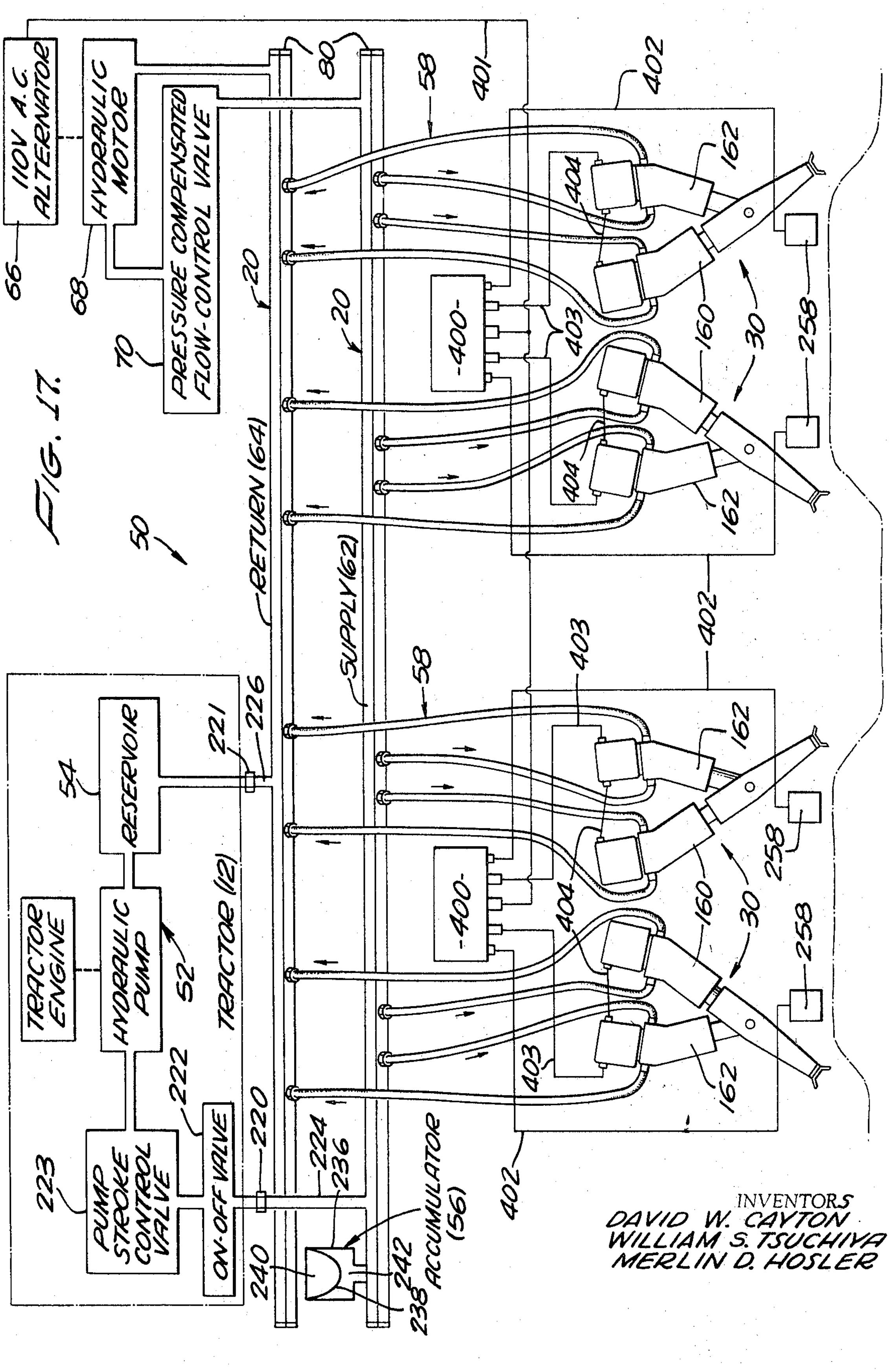
FIG. 17 is a schematic view of the hydraulic and electrical systems of the machine, the hydraulic system being shown in a two-line schematic form and the electrical system in a one-line schematic form.
Figure 19:
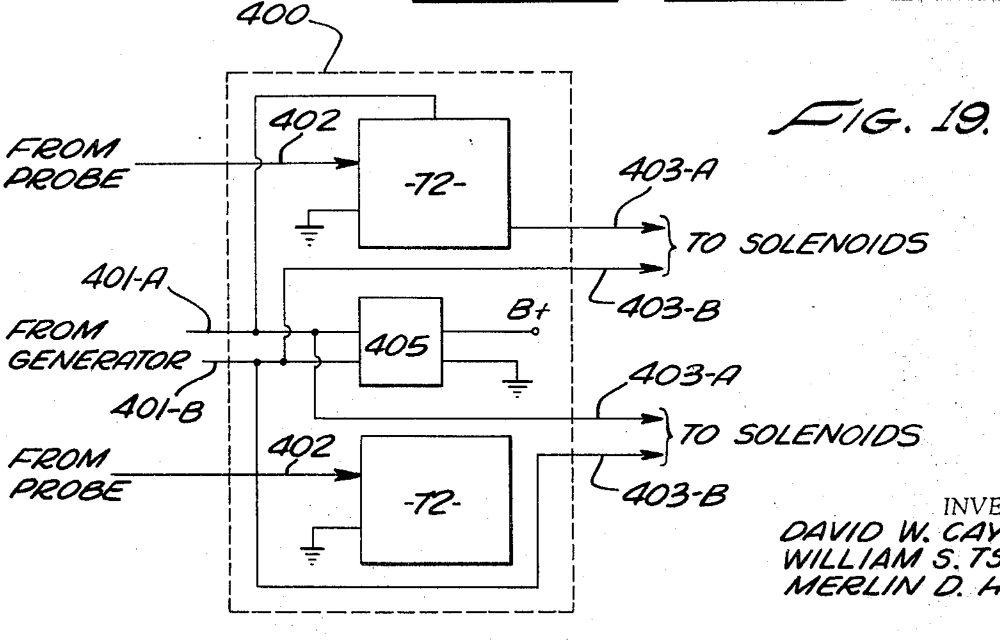
FIG. 19 is a two-line schematic diagram of the internal circuitry of one of the control boxes.

Referring to FIG. 17, a single generator 66 provides 110 volt A.C. operating energy for the electrical control circuits and solenoids of all four of the crop thinning devices 30. As previously pointed out, each of the crop thinning devices includes a pair of solenoids, one for each of the hydraulic actuators 160, 162, the solenoid coils being designated as 216. In each crop thinning device a two-conductor cable 403 (FIG. 19) carries 110 volt energy to one of the solenoid coils 216, with the second solenoid coil being connected in parallel with the first by means of a separate two-conductor cable 404 (FIG. 17). A separate electrical control box 400 is supported from the tool bars 20 on each side of the tractor, for housing the control circuitry for the associated pair of crop thinning devices 30. The internal wiring for each control box is shown in FIG. 19. As seen in FIG. 19, one of the conductors 401–B contained in cable 401 from the generator extends through the interior of control box 400 without interruption to the solenoids of each of the associated pair of crop thinners, being redesignated as 403–B where it enters the cables 403 that interconnect control box 400 to the solenoids. The other conductor 401–A is connected through the associated control circuit 72, which selectively switches the power to the solenoids on and off, and thereby controls the cutting action of the associated thinner. Each control box 400 also contains a power supply circuit 405 which converts energy from the generator to low voltage D.C. form to provide operating potential for the control circuits 72.

The physical arrangement and location of control boxes 400 is best seen in FIGS. 1, 2, 3, and 5. The electrical connections to each control box include the power cable 401 previously mentioned, the solenoid cables 403 previously mentioned, and a pair of probe cables 402 which are connected to the respective probes of the associated pair of crop thinning devices. The presence of a plant or other object in the row crop is determined by resistance measurement between the probe 258 and ground. Therefore, each probe cable 402 contains only a single conductor, and one side of each control circuit 72 is electrically grounded as shown in FIG. 19. The common ground connection is the metal tool bar frame 18. Each control circuit 72 is ground to the metal wall of the control box 400, which is conductively attached to the tool bar frame, and each of the ground rollers 28 is also conductively attached to the tool bar frame. The surface of each of the rollers 28 provides a good electrically conductive engagement with the earth or ground that is being traversed by the machine, thus completing the electrical circuit through the probe 258, probe cable 402, and the respectively associated control circuit 72.

It will be noted that the solenoid coils are not grounded to the frame of the machine but are powered by a two-conductor circuit which is independent of an insulated from the frame. This circuit includes the two conductors of cable 401, the two conductors of cable 403, and the two conductors of cable 404.

The function of each electrical control circuit 72 is to respond to signals received from the associated probe 258 so as to actuate, at the proper times, the pair of solenoids which control the operation of the actuator valves of the associated crop thinning device 30. As has previously been pointed out, when neither of the solenoids is energized, the thinner blade 60 occupies a rest position on one side of the row, and when both solenoids are energized, the blade swings through the row and occupies a rest position on the opposite side. The enerigization of both solenoid devices is then maintained until a plant is detected by the probe 258, at which time the solenoid devices are de-energized, resulting in the blade returning to its original position. The function of each electrical control circuit 72, therefore, is to control the cutting action of the blade, whether it be changing the solenoids from a de-energized state to an energized state, or vice versa. Insofar as the cutting action of the thinner is concerned, it is immaterial whether the blade movement is accomplished by solenoid energization, or by solenoid de-energization.

Figure 20:
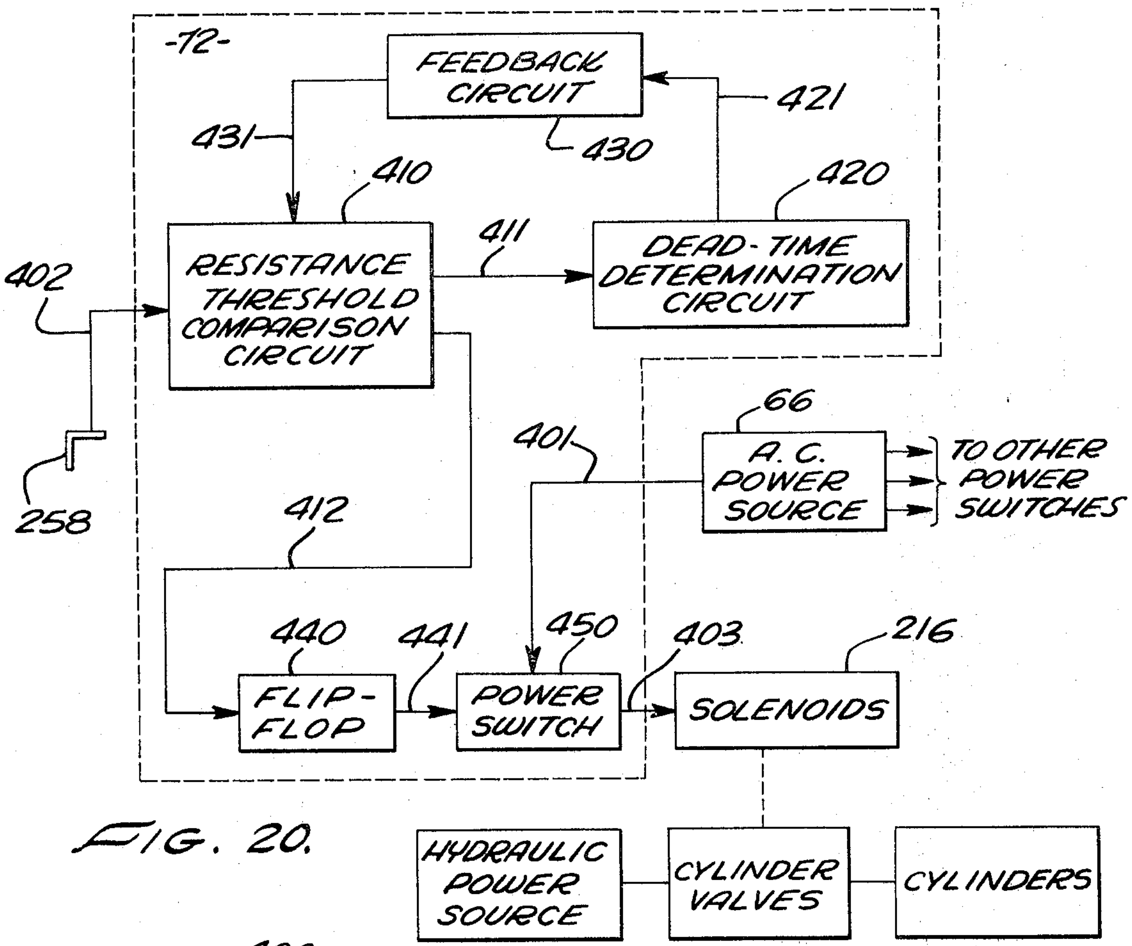
FIG. 20 is a one-line schematic diagram of the electrical control circuit for one of the thinners.

Referring now to FIG. 20, it will be seen that each of the electrical control circuits 72 includes a resistance threshold comparison circuit 410, to which the associated probe 258 is electrically connected. The function of circuit 410 is to measure the resistance value between the probe 258 and ground, and to produce an output signal whenever this resistance value falls below its predetermined threshold level. According to the presently preferred design, the predetermined resistance threshold level is 5.6 megohms. When the circuit 410 determines that the input resistance observed on cable line 402 is less than this threshold value, an output signal is produced on both of the output lines 411 and 412. The low probe resistance may be caused by dirt or a dead plant or other electrically conductive material, in which case the circuit 410 will produce an erroneous output signal. It will be noted that circuit 410 may be considered as an analogue-to-digital conversion circuit, since it observes the analogue value of resistance between the probe and ground and converts this to a "yes" or "no" output.

The output signal on line 411 is supplied to a dead-time determination circuit 420, which computes a predetermined time interval commencing upon its reception of a signal from circuit 410. During its measurement of this predetermined time interval, known as the dead-time, circuit 420 also sends a feedback signal on signal line 421 through a feedback circuit 430 and signal line 431 to the threshold comparison circuit 410. So long as that feedback signal is being applied to circuit 410, it is rendered incapable of accepting another input signal from line 402. When the predetermined dead-time interval has passed, as determined by circuit 420, then the feedback signal on line 431 is discontinued, and threshold circuit 410 is again able to accept an input signal from 402.

The dead-time provision is required due to the extreme sensitivity of the control circuit 72. Most of all of the plants encountered by the probe 258 have a number of separate leaves, and control circuit 72 is able to respond individually to each leaf that is encountered. In the absence of a dead-time circuit, therefore, the engagement of the probe 258 with a plant would result in not just one, but several, cutting actions of the blade. Since this is unnecessary and undesirable, the dead-time circuit is used for the purpose of disabling the input for a period of time which is at least equal to the time required for the machine to pass the thickest plant that would normally be encountered. The preferred circuit includes a manual selector switch for selecting a desired value of the dead-time interval, depending on the particular crop being thinned.

The useful output signal from circuit 410 is supplied via signal line 412 to a flip-flop circuit 440. A flip-flop circuit is a special type of multivibrator circuit which is neither free running, nor stable in only one of its two possible states, but rather is stable in both of its two possible states. Thus an input signal is required to "flip" the flip-flop from one of its states to the other, or vice versa. In the present application, the flip-flop is preferably a triggering circuit in which both of its inputs are connected together, and the flip-flop responds to each input signal that it receives by changing its state from that which it then occupies to its alternate state.

Also contained in the control circuit 72 is a power switch 450, which is interposed between the generator 66 and the solenoid coils 216 for controlling the energization of the solenoid coils. When power switch 450 is open, the solenoid coils are not energized and the blade 60 is in one of its rest positions. When the power switch 450 is subsequently closed, the solenoids are energized and the blade swings to its other rest position. Since the output of flip-flop 440 is supplied on signal line 441 to the power switch 450, the state of the power switch is therefore controlled by the state of the flip-flop. That is, the power switch is open during one state of the flip-flop and is closed during the other state. The logical significance of this arrangement is that the flip-flop 440 acts as a memory or storage device for remembering the position occupied by the cutting blade 60. The threshold comparison circuit 410 has no memory, but simply generates a "yes" or "no" output, with a "yes" output meaning "it is time to cut the row." This signal is applied to the flip-flop 440, which changes its state and causes the power switch 450 and solenoid coils 216 to likewise change their conditions, resulting in movement of the blade through the row to its alternate rest position.

Figure 21:
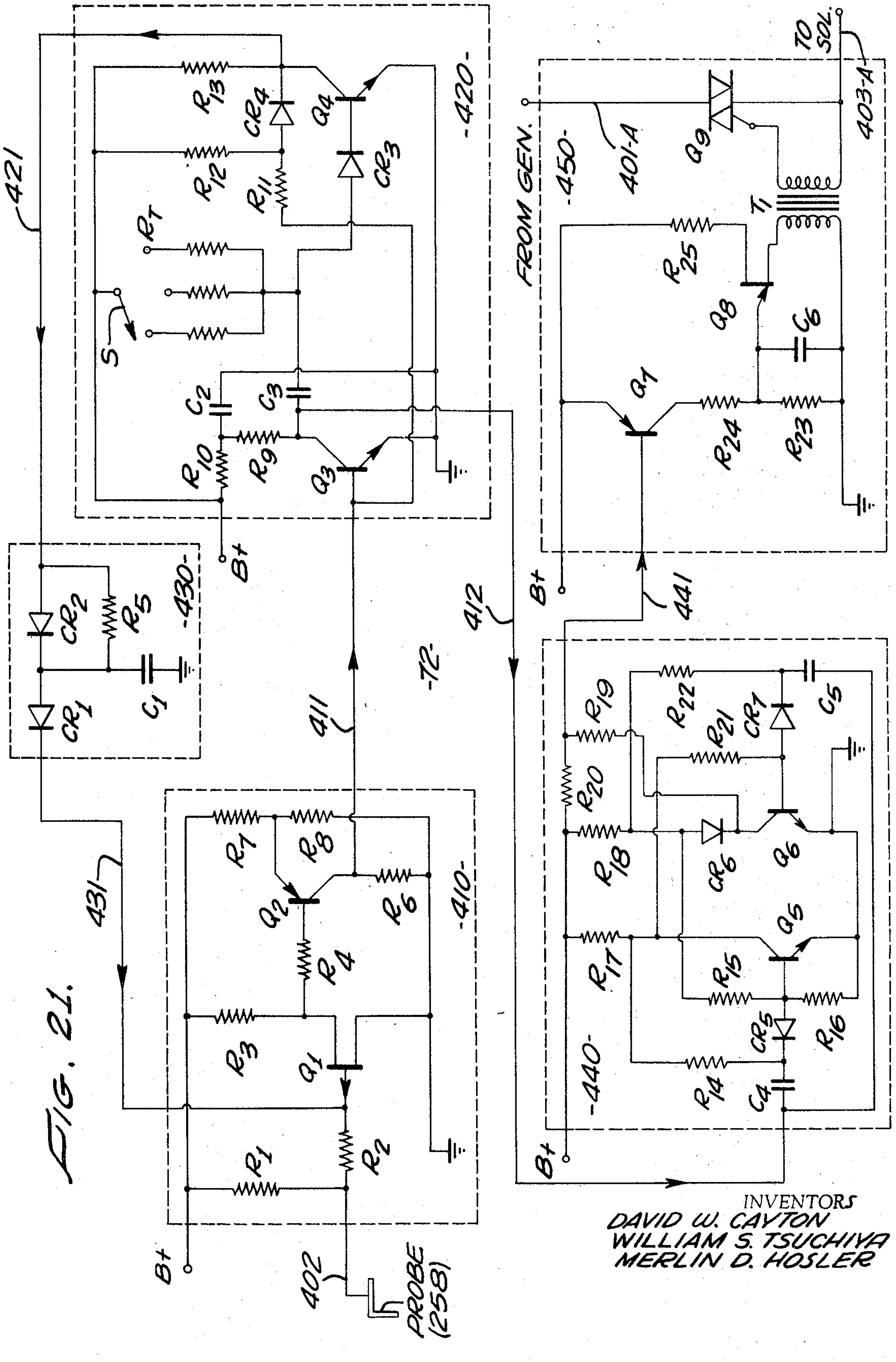
FIG. 21 is a detailed two-line schematic wiring diagram of the electrical control circuit for one of the thinners.

Reference is now made to FIG. 21 which illustrates the detailed construction of electrical control circuit 72. Each of the constituent circuits 410, 420, 430, 440, and 450 will be separately described, after which the cooperative relationship of the circuits to each other will be described.

In the threshold circuit 410 a resistor R–1 is connected between probe 258 and B+, so as to provide a resistance bridge in conjunction with the observed resistance of the plant or other object contacted by the probe. A field-effect transistor Q–1 has its gate connected to the probe through a resistor R–2 while its source is connected to B+ through a resistor R–3 and its drain is grounded. A transistor Q–2 has its base connected to the source of Q–1 through a resistor R–4, while the emitter of Q–2 is connected through resistor R–7 to B+ and also through R–8 to ground. The collector of Q–2 is grounded through a resistor R–6. The presently preferred circuit values, with B+ of 12 volts, are as follows:

Q–1—U–147
Q–2—2N3702
R–1—5.6 megohm
R–2—1 megohm
R–3—12,000 ohms
R–4—12,000 ohms
R–6—47,000 ohms
R–7—5,600 ohms
R–8—5,600 ohms The operation of the threshold circuit is as follows. Probe 258 normally does not contact a plant or other object, hence the resistance between the probe and ground is essentially infinite. Since Q–1 is connected as a source follower, the potential on its source, at the juncture of R–3 and R–4, is normally the B+ voltage of 12 volts. Q–2 is then cut off and does not conduct. It will be noted that due to the equal values of R–7 and R–8, the emitter of Q–2 is normally biased at +6 volts. When the resistance value observed by the probe drops, the source voltage of Q–1 drops accordingly, and when the observed resistance reaches about 5.6 megohms, the value of R–1, the base potential of Q–2 then permits Q–2 to become conductive. Conduction of Q–2 causes substantial current to flow through R–6, raising the potential on the collector of Q–2 and supplying an output signal to the signal line 411. It will be noted that this output signal is a voltage level and not a pulse. It will thus be seen that threshold circuit 410 provides a comparison between one resistance bridge consisting of R–1 and the probe resistance, and another resistance bridge consisting of R–7 and R–8, and produces an output signal only when the probe resistance drops below the point at which comparison is achieved.

Dead-time circuit 420 includes transistors Q–3 and Q–4 interconnected to form a one-shot multivibrator, that is, a multivibrator circuit having one stable state and one unstable state. A plurality of timing resistors collectively designated as $R_T$ are utilized in conjunction with a manual selection switch S for selecting the time interval that the one-shop multivibrator will remain in its unstable state, and hence the dead-time for probe 258. The signal line 411 is connected to the base of Q–3, and the emitter of Q–3 is grounded while its collector is connected to a resistor R–9. A resistor R–10 is connected between B+ and the positive end of R–9, while a capacitor C–2 is connected between the positive end of R–9 and ground. Resistor R–10 and capacitor C–2 together form a filtering circuit to prevent the one-shop multivibrator from being triggered by noise signals received from the power supply and passing through resistor R–9 to transistor Q–3. Capacitor C–3 has one terminal connected to the collector of Q–3 while its other terminal is connected to the anode of a semiconductor diode CR–3. Timing resistors $R_T$ have a commonly connected end which is connected to the second terminal of capacitor C–3, while the movable blade of switch S is utilized to connect the other end of a selected one of the resistors $R_T$ to the B+ terminal. The cathode of diode CR–3 is connected to the base of transistor Q–4, whose emitter is grounded. In the collector circuit of Q–4 a resistor R–12 provides the load, having one end connected to B+; however, another semiconductor diode CR–4 has its anode connected to the second end of R–12 while its cathode is connected to the collector of Q–4. A resistor R–13 is connected between B+ and the collector of Q–4. A coupling resistor R–11 is connected between signal line 411, that is, the base of Q–3, and the anode of diode CR–4. Output signal line 421 is connected to the collector of Q–4. The presently preferred circuit values are as follows:

Q–3—2N3707
Q–4—2N3707
R–9—12,000 ohms
R–10—1,000 ohms
C–2—0.1 microfarad
C–3—1 microfarad
R–11—47,000 ohms
R–12—47,000 ohms
R–13—47,000 ohms
$R_T$—Minimum 300,000 ohms, maximum 820,000 ohms The operation of the dead-time circuit is as follows. In the normal or quiescent state of the circuit transistor Q–3 is turned off and transistor Q–4 is conducting. The charge on capacitor C–3 is then approximately equal to the power supply voltage, or 12 volts. At that same time the base potential of Q–3 is near ground, since it is not receiving any positive voltage from registor R–6, and the current conduction of Q–4 causes almost the entire power supply voltage to appear across resistor R–12 and hence results in substantially no bias potential being applied to the base of Q–3 through resistor R–11. But when a signal is received on signal line 411, a switching action of the one-shot multivibrator takes place. The signal causes the base potential of Q–3 to be raised up and held in that raised condition; Q–3 then becomes conductive; a heavy current flows through resistor R–9, causing practically all of the power supply voltage to appear across R–9; and the potential of the Q–3 collector drops down and initially pulls with it both plates of capacitor C–3 so that the anode of diode CR–3 drops to approximately −12 volts. Q–4 is then cut off. Capacitor C–3 then commences to lose its charge in accordance with a timing cycle whose time constant is equal to the product of the capacitance value of C–3 and the resistance value of the selected one of the timing resistors $R_T$. As the charge on C–3 diminishes, the anode of diode CR–3 rises up toward ground potential, and transistor Q–4 again becomes conductive. The voltage on the collector of Q–4 then falls from a value near the power supply voltage of 12 volts to a value near ground potential, and at the same time this change in potential is transmitted through resistor R–11 to the base of Q–3, causing Q–3 to become cut off. The cutting off of Q–3 does not immediately return the circuit to a condition ready for the acceptance of a new input signal, however. Rather, it is necessary for the full charge of capacitor C–3 to be restored, which is accomplished by current flowing through R–10, R–9, CR–3, and the base-emitter junction of Q–4.

The purpose of the feedback circuit 430 is to disable Q–1 from accepting an input signal until the dead-time circuit 420 has fully recovered and is ready to accept a new input signal. In feedback circuit 430 a semiconductor diode CR–2 has its anode connected to signal line 421, and a resistor R–5 is connected in parallel with CR–2. A capacitor C–1 is connected between the cathode of CR–2 and ground. A semiconductor diode CR–1 has its anode connected to the cathode of CR–2, and signal line 431 extends from the cathode of CR–1 to the gate of the field effect transistor Q–1. The preferred value of R–5 is 1 megohm, and of C–1, 0.1 microfarad.

The cooperative functioning of the threshold circuit 410, the dead-time circuit 420, and the feedback circuit 430, is more specifically described as follows. Resistors R–12, R–11, and R–6 form a voltage divider between B+ and ground, and when Q–4 is cut off, the potential at the junction of R–11 and R–12 is significantly below the B+ potential. However, R–13 and CR–4 together form a decoupling circuit, the operation of which permits the collector voltage of Q–4 to remain at substantially the full B+ voltage during the time when Q–4 is cut off. Thus the full B+ voltage is supplied on signal line 421 through diodes CR–2 and CR–1 to the gate of Q–1, holding the gate at or near the B+ voltage despit any drop in the resistance value observed by probe 258. During the timing cycle of C–3 and $R_T$, previously described, current also flows through signal line 421 and diode CR–2 to charge capacitor C–1. The flow rate of this circuit is limited by R–13 which avoids any burning out of the diode CR–2. C–1 is thus charged up to the B+ voltage, and is able to maintain the gate of Q–1 at the B+ voltage even after Q–4 has again become conductive. The charge on C–1 then leaks off through R–5 and Q–4; however, this discharge time constant for C–1 is greater than the time constant for recharging C–3 through R–10 and R–9 as previously described. It will thus be seen that the feedback circuit 430 is effective to apply the feedback signal (B+ voltage) from Q–4 to the gate of Q–1 during the time when Q–4 is cut off, and is also effective thereafter for continuing to disable Q–1 until such time as capacitor C–3 in the dead-time circuit has become recharged to thereby enable the dead-time circuit to accept a new signal.

In the one-shot multivibrator 420 a complete recharging of C–3 is not necessary to permit the circuit to again switch to its unstable state; however, as previously noted, the time duration of the unstable state is a function of the charge on C–3. Therefore, in order to ensure that the full dead-time interval is obtained, it is necessary to require that C–3 be fully recharged before applying a new input signal to the circuit.

Flip-flop 440 will now be described. A pair of transistors Q–5 and Q–6 are cross-coupled to provide a bistable multivibrator circuit. The emitters of both transistors are grounded. A capacitor C–4 has one terminal connected to the signal input line 412, while a semiconductor diode CR–5 has its cathode connected to the other terminal of C–4, the anode of CR–5 in turn being connected to the base of Q–5. A capacitor C–5 is also connected to signal line 412, with its other terminal being connected to the cathode of a semiconductor diode CR–7 whose anode is connected to the base of Q–6. Resistor R–17 is connected between B+ and the collector of Q–5 to provide a collector load for Q–5, and resistor R–14 is connected between the collector of Q–5 and the cathode of CR–5. Resistor R–16 is connected between base and emitter (ground) of Q–5. Resistor R–15 is connected to the base of Q–5, its other end being connected through resistor R–18 to B+. The juncture of R–15 and R–18 is connected to the anode of a semiconductor diode CR–6 whose cathode is connected to the collector of Q–6. Resistor R–21 is connected between the collector of Q5 and the base of Q–6. Resistor R–22 is connected between the juncture of R–15 and R–18 and the cathode of CR–7. Resistor R–20 is connected to B+, and resistor R–19 is connected between the other end of R–20 and the collector of Q–6. Signal input line 441 is connected to the juncture of R–19 and R–20.

Flip-flop circuit 440 is generally conventional in its construction and operation, and also includes an output signal decoupling circuit consisting of the diode CR–6 and resistors R–19 and R–20. The circuit has two stable states, one in which Q–5 conducts and Q–6 is cut off, and the other in which Q–6 conducts and Q–5 is cut off. The circuit also has two separate inputs, represented by the capacitors C–4 and C–5, respectively, which are responsive to negative voltage pulses for switching the circuit from one stable to the other. The effect of a received pulse upon each individual input circuit is dependent upon the then existing state which the flip-flop occupies; however, since both inputs are connected together in the so-called "triggering" circuit configuration, the result is that upon receipt of each input signal, this circuit will switch from its then existing stable state into its other stable state. The effect of the output signal decoupling circuit is to decouple the signal line 441 from the load resistor R–18, so that the voltage on signal line 441 effectively swings between ground and the full B+ potential.

It will be noted in FIG. 20 that signal line 412 is shown as being derived from threshold comparison circuit 410, while in the detailed circuit of FIG. 21 it appears that signal line 412 is actually derived from dead-time circuit 420. The reason for this discrepancy is that the signal appearing on signal line 411 also appears in amplified (as well as inverted) form at the collector of Q–3, and its is advantageous to drive signal line 412 and hence flip-flop 440 with this amplified signal.

The preferred circuit values for flip-flop 440 are as follows:

Q–5—2N3707
Q–6—2N3707
R–14—100,000 ohms
R–15—47,000 ohms
R–16—47,000 ohms
R–17—12,000 ohms
R–18—27,000 ohms
R–19—27,000 ohms
R–20—27,000 ohms
R–21—47,000 ohms
R–22—100,000 ohms
C–4—0.01 microfarad
C–5—0.01 microfarad Power swtich 450 will now be described. A transistor Q–7 has its emitter connected to the power supply terminal $B^+$, its base connected to signal line 441, and its collector is grounded through the series combination of resistors R–24 and R–23. A capacitor C–6 is connected in parallel with R–23. A unijunction transistor Q–8 has its emitter connected to the juncture of R–23 and R–24. Base 2 of Q–8 is connected through a resistor R–25 to $B^+$, while Base 1 is connected through the primary winding of a pulse transformer $T_1$ to ground. The secondary winding of the pulse transformer has one terminal connected to conductor 403–A which extends to the solenoid coils 216. A triac Q–9 has its T–1 terminal connected to line 403–A. The gate of the triac Q–9 is connected to the other terminal of the transformer secondary winding. The terminal T–2 of Q–9 is connected to conductor 401–A which extends from generator 66. The preferred circuit values for the power switch are as follows:

Q–7—2N3702
Q–8—T1S43
Q–9—SC41B
R–23—47,000 ohms
R–24—3,300 ohms
R–25—100 ohms
C–6—0.1 microfarad The operation of the power switch 450 is as follows. Energy is supplied from the generator 66 on conductor 401–A at a nominal voltage of 110 volts A.C. and a frequency of 60 cycles per second. The function of the triac Q–9 is, when triggered, to pass both halves of each cycle of the A.C. voltage from the generator on to the solenoid windings. The unijunction transistor Q–8 and its associated circuit elements form an oscillator circuit having an oscillating frequency of at least 600 cycles per second, and more typically about 800 cycles per second. When the oscillator is running, each voltage cycle produces both a positive pulse and a negative pulse, during the corresponding halves of the cycle, across the secondary winding of the pulse transformer. These pulses are applied between terminal T–1 and the gate of the triac, and are therefore effective to trigger the triac into a conductive state regardless of the then existing polarity of the generator voltage. Transistor Q–7 simply functions as a switch to selectively supply energy to the unijunction oscillator, or not to supply such energy, in accordance with the then existing stable state of flip-flop 440.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. Crop thinning means for a crop thinning machine movable along a plant row and having a fluid pressure system, comprising:

a frame;

an oscillatory crop thinning tool carrier mounted on said frame for transverse swinging movement about a fore-and-aft extending axis through first and second normal positions of rest located at opposite sides of an intervening plane containing said axis into first and second overtravel regions beyond said first and second rest positions, respectively, and a pair of extensible and retractable fluid pressure motors having extension strokes and periodically selectively pressurized with working fluid from said fluid pressure system, each motor being operatively connected between said frame and tool carrier to alternately drive said carrier during its extension stroke to one rest position in alternate sequence with said other motor driving the carrier to the other rest position, and each motor moving through bottom dead center between extension and retraction respectively as it drives the carrier through the rest position to the overtravel region so that during each stroke of said carrier from either rest position, energy is initially transferred from a fluid motor to said carrier to drive said carrier to the other rest position with a velocity such that momentum continues driving of said carrier through said other rest position with a velocity such that momentum continues driving of said carrier through said other rest position into the adjacent overtravel region, and thereafter energy is transferred from said carrier to said fluid motor as said carrier travels through said other rest position into said adjacent overtravel region to effect arresting of said carrier and return of said carrier to said other rest position.

2. Crop thinning means according to claim 1 wherein: said fluid pressure motors are connected to said frame and tool carrier in such manner that alternate pressurizing of said actuators is effective to drive said tool carrier to said rest positions in said alternate sequence, and further characterized by valves mounted directly on said actuators for selectively communicating said actuators to said accumulator system.

3. Crop thinning means for a crop thinning machine movable along a plant row comprising:

a frame;

an oscillatory crop thinning tool carrier mounted on said frame for movement through first and second normal positions of rest located at opposite sides of an intervening plane into first and second overtravel regions beyond said first and second rest positions, respectively, fluid pressure means for driving said tool carrier to said rest positions in alternate sequence, means including a fluid pressure system for selectively supplying working fluid under pressure to said fluid pressure means to effect driving of said carrier to said rest positions in said alternate sequence, and said fluid pressure means comprising alternately driven extensible and retractable fluid motors operatively connected between said frame and said tool carrier for driving said tool carrier alternately to said rest positions and from thence into the respective overtravel regions as said motors pass through bottom dead center between extension and retraction respectively so that during each stroke of said carrier from either rest position, energy is initially transferred from part of said motors to said carrier to drive said carrier toward the other rest position with such velocity that momentum continues driving of said carrier through said other rest position into the adjacent overtravel region, and thereafter energy is transferred from said carrier to said part of said fluid motors to effect arresting of said carrier and return of the latter to said other rest position.

4. A crop thinning machine comprising, in combination:

a frame adapted to be positioned above a row crop and to be advanced therealong;

a blade arm having its upper end pivotally coupled to said frame, and extending downwardly therefrom so that said blade arm is swingable in a plane that lies perpendicular to the row between two limit positions on respective sides of the row;

a cutting blade secured to the lower end of said blade arm and adapted to cut out a portion of the row each time that said blade arm swings from one of its limit positions to the other of its limit positions;

a pair of drive cylinders, each having an associated piston and piston rod, arranged in an essentially V-shaped configuration with said piston rod extending downward to a common point;

means pivotally connecting the lower ends of said piston rods to a point on said blade arm intermediate its two ends, so that a driving action of one of said cylinders drive said blade arm in one direction and a driving action of the other of said cylinders drives said blade arm in the other direction;

means pivotally coupling both of said cylinders to said frame, so that said cylinders, pistons, and piston rods swing back in unison with said blade arm;

means for supplying actuating fluid to said cylinders; and valve means associated with said cylinders for controlling the application of said actuating fluid thereto.

5. A crop thinning device for a crop thinning machine comprising a frame, a crop thinning tool carrier pivotally mounted adjacent its upper end on said frame for swinging movement through successive working strokes to overtravel positions beyond normal rest positions, means for swinging said carrier including a pair of alternately extensible hydraulic cylinders swingably connected at their upper ends above and to opposite sides of the pivotal mounting of the carrier on the frame, the cylinders being pivotally secured at their lower ends to said carrier below the pivotal mounting of the carrier, said rest positions occurring when the axis of each of the respective cylinders is in alignment with the pivotal mounting of the carrier.

6. A crop thinning machine including a frame movable forwardly over a plant row, an oscillatory crop thinning tool device including a tool carrier mounted on the frame for rocking movement about a fore-and-aft extending axis and having a fore-and-aft extending cutting tool fixed to the underside thereof adapted to oscillate in sweeping actions across the row for removing sections of plants therefrom and for moving through first and second normal positions of rest on opposite sides of the row into first and second overtravel regions beyond the first and second positions of rest respectively; fluid actuating means including a pair of extensible and retractable hydraulic cylinders pivotally mounted at their upper ends on the frame on opposite sides of the aforesaid axis, the cylinders being connected at their lower ends to the carrier in offset relation to its axis so as to traverse the carrier axis and move to and from aligned positions with the carrier axis during extension, said aligned positions occurring coincident with the tool being in its respective positions of rest.

7. Crop thinning means for a crop thinning machine movable along a plant row and having a fluid pressure system, comprising:

a frame;

an oscillatory crop thinning tool carrier pivotally mounted on said frame for swinging movement through first and second normal positions of rest located at opposite sides of an intervening plane into first and second overtravel regions beyond said first and second rest positions, respectively, the carrier being swingable about an axis located in said plane, and fluid pressure actuated means to be periodically selectively pressurized with working fluid from said fluid pressure system and operatively connected between said frame and tool carrier for periodically driving said carrier to said rest positions in alternate sequence, the fluid actuating means comprising first and second fluid pressure actuators for driving said tool carrier to said first and second rest positions, respectively, and having expansible pressure chambers for selective communication to said fluid pressure system, and means pivotally connecting each actuator to said frame and tool carrier, respectively, in such manner that admission of said working fluid to the pressure chamber in each actuator progressively expands the respective chamber to cause movement of said tool carrier to the corresponding rest position and thereafter the respective chamber progressively contracts during continued movement of said carrier beyond the latter rest position into the adjacent overtravel region, whereby during each stroke of said tool carrier, working fluid initially flows from said fluid pressure system to the pressure chamber of the currently pressurized actuator to effect energy transfer from said fluid pressure system to said carrier and driving of said carrier to the corresponding rest position, and working fluid is thereafter displaced from the pressurized actuator back to said fluid pressure system as said carrier enters the adjacent overtravel region to effect energy transfer from said carrier to said fluid pressure system and arresting of said carrier.

8. Crop thinning means according to claim 7 wherein: each said actuator comprises a cylinder and a plunger movable in said cylinder, and means pivotally mounting said cylinders on said frame and pivotally connecting said plungers to said tool carrier in such manner that said carrier and each actuator have a dead center condition wherein said carrier is situated in the corresponding rest position and the pivot axes of said carrier and the respective actuator are located in a common plane inclined at an acute angle relative to said first mentioned plane, whereby the cylinder and plunger of each actuator undergo initial relative axial movement in a direction to expand the respective cylinder chamber during swinging movement of said carrier to the corresponding rest position and subsequent relative axial movement in the opposite direction to contract the respective cylinder chamber during continued swinging movement of said carrier beyond said corresponding rest position into the adjacent overtravel region.

References Cited

UNITED STATES PATENTS

| | | | |
|---|---|---|---|
| 1,898,852 | 2/1933 | Powell | 172—70 |
| 2,442,814 | 6/1948 | Kaiser | 172—93 |
| 2,592,689 | 4/1952 | Hann | 172—6 |
| 3,233,681 | 2/1966 | Ferte | 172—6 |
| 3,311,176 | 3/1967 | Cleland | 172—225 |
| 3,358,775 | 12/1967 | Garrett | 172—6 |

FOREIGN PATENTS

| | | |
|---|---|---|
| 900,280 | 7/1962 | Great Britain. |

ROBERT E. PULFREY, Primary Examiner

A. E. KOPECKI, Assistant Examiner

U.S. Cl. X.R.

172—6, 58

UNITED STATES PATENT OFFICE

CERTIFICATE OF CORRECTION

Patent No. 3,525,403 Dated 25 August 1970

Inventor(s) David W. Cayton, William S. Tsuchiya, and Merlin D. Hosler

It is certified that error appears in the above-identified patent and that said Letters Patent are hereby corrected as shown below:

Column 23, lines 73-75, delete "with a velocity....rest position".

SIGNED AND SEALED DEC 22 1970

(SEAL)
Attest:

Edward M. Fletcher, Jr.
Attesting Officer

WILLIAM E. SCHUYLER, JR.
Commissioner of Patents